US010810301B2

(12) United States Patent
Sakai

(10) Patent No.: US 10,810,301 B2
(45) Date of Patent: Oct. 20, 2020

(54) INFORMATION PROCESSING DEVICE, INFORMATION PROCESSING METHOD, PROGRAM, AND STORAGE MEDIUM

(71) Applicant: Rakuten, Inc., Tokyo (JP)

(72) Inventor: Ryosuke Sakai, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 571 days.

(21) Appl. No.: 15/522,967

(22) PCT Filed: Oct. 28, 2014

(86) PCT No.: PCT/JP2014/078604
§ 371 (c)(1),
(2) Date: Mar. 1, 2018

(87) PCT Pub. No.: WO2016/067362
PCT Pub. Date: May 6, 2016

(65) Prior Publication Data
US 2018/0173870 A1    Jun. 21, 2018

(51) Int. Cl.
*G06F 21/45* (2013.01)
*G06F 21/62* (2013.01)
*H04L 29/06* (2006.01)

(52) U.S. Cl.
CPC .......... *G06F 21/45* (2013.01); *G06F 21/6245* (2013.01); *H04L 63/083* (2013.01); *G06F 2221/2117* (2013.01)

(58) Field of Classification Search
CPC ................. G06F 21/45; G06F 21/6245; G06F 2221/2117; H04L 63/083
See application file for complete search history.

(56) References Cited

U.S. PATENT DOCUMENTS

| 10,388,072 B2* | 8/2019 | Egeler | G06F 3/011 |
| 2006/0156026 A1* | 7/2006 | Utin | G06F 21/31 |
| | | | 713/183 |

(Continued)

FOREIGN PATENT DOCUMENTS

WO    2012/046670 A1    2/2014

*Primary Examiner* — Cheng-Feng Huang
(74) *Attorney, Agent, or Firm* — Sughrue Mion, PLLC

(57) ABSTRACT

The information processing device includes a registration information obtaining unit, a data generating unit and a transmission processing unit. The registration information obtaining unit obtains user identification information, a login password, and attribute information in association with one another as user registration information. The data generating unit generates incomplete attribute information and complementary attribute information such that the attribute information can be reconstructed by combining the incomplete attribute information and the complementary attribute information with each other. The transmission processing unit transmits the user identification information, the login password, the incomplete attribute information, and the complementary attribute information to another information processing device. The transmission processing unit transmits the user identification information, the login password, and the incomplete attribute information to the another information processing device, and the transmission processing unit transmits the complementary attribute information in response to a request from the another information processing device.

16 Claims, 12 Drawing Sheets

(56) References Cited

U.S. PATENT DOCUMENTS

| | | | |
|---|---|---|---|
| 2013/0185806 A1* | 7/2013 | Hatakeyama | G06F 21/6245 726/27 |
| 2013/0260796 A1* | 10/2013 | Hasek | H04N 21/25816 455/456.3 |
| 2015/0149787 A1* | 5/2015 | Panchapakesan | H04L 63/083 713/184 |
| 2015/0334108 A1* | 11/2015 | Khalil | G06F 21/31 726/8 |
| 2016/0337124 A1* | 11/2016 | Rozman | H04L 9/085 |

* cited by examiner

INFORMATION PROCESSING DEVICE, INFORMATION PROCESSING METHOD, PROGRAM, AND STORAGE MEDIUM

CROSS REFERENCE TO RELATED APPLICATIONS

This application is a National Stage of International Application No. PCT/JP2014/078604 filed Oct. 28, 2014.

TECHNICAL FIELD

The present invention relates to handling of registration information of users receiving service. Specifically, the present invention relates to transmission and reception processing when registration information of users is shared between a plurality of services.

CITATION LIST

Patent Literature

Patent Literature 1: Domestic re-publication of PCT international publication for patent application No. 2012-046670

BACKGROUND ART

Companies providing some service to users generally register and manage information of users receiving the service. Some service providing companies may provide a plurality of services. For example, some companies may provide service in Japan and service in the United States of America. In such a case, a server managing the registration information of users receiving the service in Japan and a server managing the registration information of users receiving the service in the United States of America may be different information processing devices. In a case where a user receiving the service in Japan performs user registration for the service in the United States of America in order to receive the service in the United States of America, the registration information of the user which registration information is already managed by the server in Japan may be transmitted to the server in the United States of America to save the trouble of inputting the user registration information managed by the server in Japan to the server in the United States of America again.

SUMMARY OF INVENTION

Technical Problems

In such a case, depending on the state of a network, it may takes time to transmit the user registration information, or the transmission itself may be impossible in some cases. In addition, it is possible that the user registration information may be sent to the server in the United States of America in advance before the user expresses an intention of receiving the service in the United States of America. However, there is a desire not to diffuse the user registration information indiscriminately from a viewpoint of protection of personal information.

It is accordingly an object of the present invention to provide an information processing device that surely transmits or receives user registration information when the user registration information becomes necessary, without indiscriminately diffusing the user registration information or a part of the information.

Solution to Problems

An information processing device according to the present invention includes a registration information obtaining unit, a data generating unit and a transmission processing unit. The registration information obtaining unit is configured to obtain user identification information, a login password, and attribute information in association with one another as user registration information. The data generating unit is configured to generate incomplete attribute information and complementary attribute information such that the attribute information can be reconstructed by combining the incomplete attribute information and the complementary attribute information with each other. The transmission processing unit is configured to be able to transmit the user identification information, the login password, the incomplete attribute information, and the complementary attribute information to another information processing device. The transmission processing unit transmits the user identification information, the login password, and the incomplete attribute information to the another information processing device after the registration information obtaining unit obtains the user registration information. The transmission processing unit transmits the complementary attribute information in response to a request from the another information processing device after the transmission of the user identification information, the login password, and the incomplete attribute information.

Hence, minimum information necessary for login is transmitted to the another information processing device, and the attribute information of a user which attribute information is desired not to be diffused indiscriminately is transmitted as incomplete information. In addition, the complementary attribute information enabling the attribute information to be reconstructed is transmitted on the basis of a request.

In addition, the above-described information processing device according to the present invention is an information processing device that manages user registration information of a user receiving a service in a certain region, and can perform transmission and reception to and from the another information processing device that manages user registration information of a user receiving a service in another region.

Thus, the attribute information of the user which attribute information is desired not to be indiscriminately diffused outside a certain region is transmitted in an unreconstructable state, that is, as incomplete attribute information to the another information processing device managing the users in another region, and the complementary attribute information enabling the reconstruction of the attribute information is transmitted on the basis of a request from the another information processing device managing the another region.

Further, in the above-described information processing device according to the present invention, the data generating unit generates first to n-th incomplete attribute information and first to n-th complementary attribute information, the first to n-th complementary attribute information corresponding to the first to n-th incomplete attribute information, respectively, and being such that the attribute information can be reconstructed only by processing using the first to n-th complementary attribute information and the corresponding incomplete attribute information in combination with each other, and the transmission processing unit allocates and transmits the first to n-th incomplete attribute information to a first to an n-th other information processing devices, respectively, and allocates and transmits the first to n-th complementary attribute information to the first to n-th other information processing devices in a state in which the complementary attribute information is not in correspondence with the incomplete attribute information.

Thus, the complementary attribute information for reconstructing the user attribute information is allocated not only to the information processing device in question but also to the other information processing devices.

Furthermore, in the above-described information processing device according to the present invention, the registration information obtaining unit manages the user identification information as local user identification information in the user registration information of a user receiving only a certain service, and when the user receives another service, the registration information obtaining unit manages the local user identification information as global user identification information and manages the attribute information associated with the local user identification information of the user as attribute information associated with the global user identification information of the user in the user registration information of the user.

Thus, the user registration information of the user receiving only the certain service is managed as local information, and is prevented from being indiscriminately diffused to information processing devices managing other services.

In addition, in the above-described information processing device according to the present invention, the registration information obtaining unit performs new user registration processing of obtaining user registration information of a new user, and in the new user registration processing, input attribute information is registered in association with global user identification information as input user identification information.

Thus, the user registration information of the user which user registration information is input to receive a certain service is managed in association with the global user identification information.

Further, in the above-described information processing device according to the present invention, after the registration information obtaining unit registers user registration information of a global user receiving a plurality of services, the transmission processing unit transmits the user identification information, the login password, and the incomplete attribute information of the global user to the another information processing device.

Thus, an environment is provided in which after a user is registered as a global user, the user identification information, the login password, and the incomplete attribute information of the user can be transmitted to the another information processing device providing a service not received by the user before the user receives the service.

Furthermore, the above-described information processing device according to the present invention includes a login processing unit configured to perform login processing in response to input of the user identification information and the login password by a user, wherein after the registration information obtaining unit registers the user registration information of a global user receiving a plurality of services, and the login processing unit performs the login processing based on a login operation of the global user, the transmission processing unit transmits the user identification information, the login password, and the incomplete attribute information of the global user to the another information processing device.

This prevents diffusion of the user registration information or a part of the information that is unnecessary until the user actually logs in. Further, when the user registration information becomes necessary because the user actually logs in, the user registration information or a part of the information is transmitted to the another information processing device.

An information processing device according to the present invention includes a managing unit, a login processing unit and a reconstruction processing unit. The managing unit is configured to manage incomplete user registration information as part of user registration information. The user registration information includes user identification information, a login password and attribution information associated with one another. The incomplete user registration information includes the user identification information, the login password and incomplete attribution information associated with one another. The attribution information is reconstructable by combining the incomplete attribution information with complementary attribution information. The login processing unit is configured to perform login processing in response to input of the user identification information and the login password by a user. The reconstruction processing unit is configured to request transmission of the complementary attribute information from another information processing device, and reconstruct the attribute information on a basis of the complementary attribute information obtained and the incomplete attribute information.

Hence, the attribute information of the user which attribute information is desired not to be diffused indiscriminately is received as incomplete attribute information from the another information processing device, together with minimum information necessary for login, and further the complementary attribute information that enables the reconstruction of the attribute information of the user is received from the another information processing device on the basis of a login operation.

In addition, in the above-described information processing device according to the present invention, the information processing device is an information processing device that manages user registration information of a user receiving a service in a certain region, and can perform transmission and reception to and from the another information processing device that manages user registration information of a user receiving a service in another region.

Thus, the attribute information of a user which attribute information is desired not to be indiscriminately diffused outside a region in which a service received by the user is provided is received in an unreconstructable state. In addition, as required, a request is made to the another information processing device for transmission of the complementary attribute information that enables the reconstruction of the attribute information of the user, and the complementary attribute information is received.

Further, in the above-described information processing device according to the present invention, when the complementary attribute information cannot be obtained in response to the requesting of the transmission from the another information processing device, the reconstruction processing unit requests transmission of the complementary attribute information from yet another information processing device.

Thus, an environment is provided which can avoid a state in which the complementary attribute information cannot be obtained due to a malfunction in the another information processing device or a malfunction in a line, for example.

Furthermore, in the above-described information processing device according to the present invention, first to n-th incomplete attribute information based on the attribute information of a certain user and first to n-th complementary attribute information respectively corresponding to the first to n-th incomplete attribute information are generated by the another information processing device such that the attribute information can be reconstructed only by processing using the first to n-th complementary attribute information and the corresponding incomplete attribute information in combination with each other, and in a state in which at least one piece of incomplete attribute information of the first to n-th incomplete attribute information is transmitted from the another information processing device to the reconstruction processing unit, and at least one piece of complementary attribute information of the first to n-th complementary attribute information excluding the complementary attribute information corresponding to the incomplete attribute information transmitted to the reconstruction processing unit is transmitted to the reconstruction processing unit, the managing unit manages the incomplete attribute information and the complementary attribute information transmitted to the reconstruction processing unit in association with the user identification information of the certain user.

Thus, an environment is provided in which one piece of incomplete attribute information of the first to n-th incomplete attribute information for each user and one piece of complementary attribute information of the first to n-th complementary attribute information, the one piece of complementary attribute information not corresponding to the one piece of incomplete attribute information, are managed in association with each other for each user.

An information processing method according to the present invention is an information processing method performed by an information processing device. The information processing method including: obtaining user identification information, a login password, and attribute information in association with one another as user registration information; generating incomplete attribute information and complementary attribute information such that the attribute information can be reconstructed by combining the incomplete attribute information and the complementary attribute information with each other; performing transmission processing of transmitting the user identification information, the login password, and the incomplete attribute information to another information processing device; and transmitting the complementary attribute information in response to a request from the another information processing device after performing the transmission processing.

Appropriate processing related to the user registration information is performed by this information processing method.

Further, another information processing method according to the present invention is an information processing method performed by an information processing device. The information processing method includes managing incomplete user registration information as a part of user registration information. The user registration information includes user identification information, a login password and attribution information associated with one another. The incomplete user registration information includes the user identification information, the login password and incomplete attribution information associated with one another. The attribution information is reconstructable by combining the incomplete attribution information with complementary attribution information. The information processing method also includes performing login processing in response to input of the user identification information and the login password by a user, requesting transmission of the complementary attribute information from another information processing device, and performing reconstruction processing of reconstructing the attribute information on a basis of the complementary attribute information obtained and the incomplete attribute information.

Appropriate processing related to the user registration information is performed also by this information processing method.

A program according to the present invention is a program for making an arithmetic processing device perform processing performed as the above-described information processing method.

A storage medium according to the present invention is a storage medium storing the above-described program. The above-described information processing device is implemented by the program or the storage medium.

Advantageous Effect of Invention

According to the present invention, it is possible to provide an information processing device that surely transmits or receives user registration information when the user registration information becomes necessary without indiscriminately diffusing the user registration information or a part of the information.

DESCRIPTION OF EMBODIMENTS

A present embodiment will be described by taking, as an example, regional servers for respective regions which regional servers manage the user registration information of users receiving services provided in the respective regions and a master server that has control over the regional servers.

The embodiment will be described in the following order.
<1. General Configuration>
<2. Incomplete Attribute Information and Complementary Attribute Information>
[2-1. First Embodiment]
[2-2. Second Embodiment]
<3. Hardware Configuration>
<4. Flow of Processing>

[4-1. Example of Processing in New User Registration]
[4-2. Example of Processing in Changing User Registration Information]
[4-3. First Example of Processing in Receiving New Service]
[4-4. Second Example of Processing in Receiving New Service]
<5. Other Modifications>
<6. Summary>
<7. Program and Storage Medium>

1. GENERAL CONFIGURATION

A configuration of a network system as a whole including a master server 1 and regional servers 3A, 3B, . . . according to the present embodiment will be described with reference to FIG. 1, FIG. 2, and FIG. 3.

Figure 1:
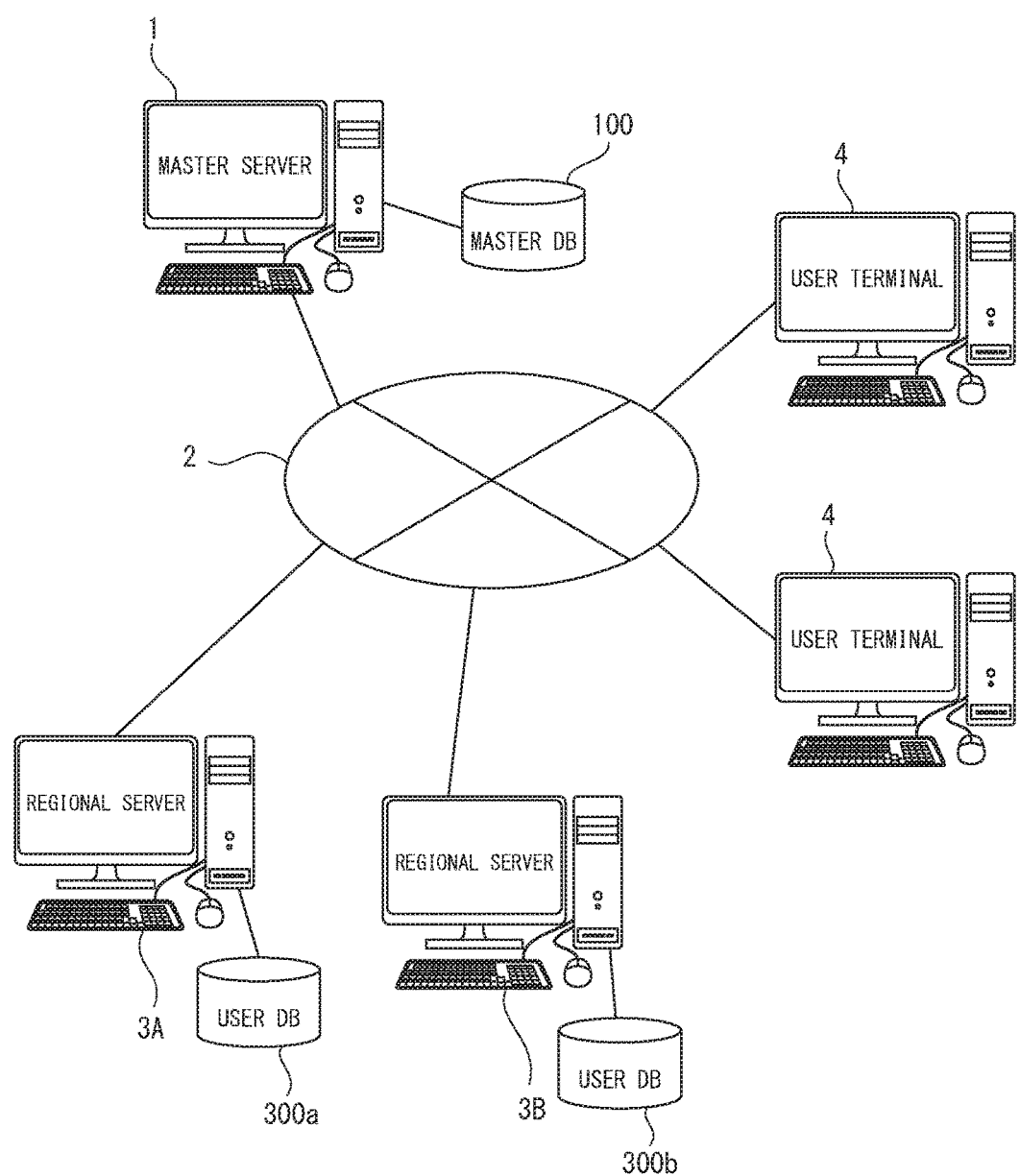
FIG. 1 is a diagram depicting a general configuration of an embodiment of the present invention.

As depicted in FIG. 1, the master server 1 according to the present embodiment is mutually communicably connected to the regional servers 3A, 3B, . . . and user terminals 4, 4, . . . via a communication network 2.

The master server 1 is a server that manages the user registration information of users receiving various kinds of services provided by the regional servers 3A, 3B, . . . . The master server 1 includes an information processing device having a function of transmitting and receiving the user registration information on the basis of requests from the regional servers 3A, 3B, . . . .

Incidentally, the user registration information includes user identification information (user ID), a login password, and user attribute information (for example information such as an address, a telephone number, hobbies, preferences, and/or the like).

The configuration of the communication network 2 is not particularly limited. However, the communication network 2 is assumed to be for example the Internet, an intranet, an extranet, a local area network (LAN), a community antenna television (CATV) communication network, a virtual private network (VPN), a telephone network, a mobile communication network, a satellite communication network, or the like.

In addition, various examples are assumed for a transmission medium constituting the whole or a part of the communication network 2. For example, wire transmission media such as Institute of Electrical and Electronics Engineers (IEEE) 1394, Universal Serial Bus (USB), a power-line carrier, a telephone line, and the like can be used, and radio transmission media such as infrared radiation as in Infrared Data Association (IrDA), Bluetooth (registered trademark), 802.11 radio, a mobile telephone network, a satellite channel, a terrestrial digital network, and the like can be used.

The regional servers 3A, 3B, . . . are each a server (information processing device) that has a function of providing some service, and which manages the user registration information of users receiving the service. In the following description, when one of the regional servers 3A, 3B, . . . is referred to without the regional servers 3A, 3B, . . . being distinguished from each other, the regional server will be described as a regional server 3.

The service provided by the regional server 3 is for example electronic commerce service, social networking service (SNS), or the like in a certain country or region. Of course, the service may be targeted for the whole world without being limited to a certain specific country or region. For example, the regional servers 3A and 3B may be servers providing service across a plurality of countries or regions, with the regional server 3A providing service for males, and with the regional server 3B providing service for females. In addition to gender, kinds of service may be divided from various angles, such as age, hobbies, tastes, and the like. Of course, types of service may be divided according to the types themselves, as in a case where the regional server 3A provides electronic commerce service and the regional server 3B provides chat service, for example.

Incidentally, the regional servers 3 may be servers providing different services in a same region. Specifically, for example, the regional server 3A may be a server providing service A in Japan, the regional server 3B may be a server providing service B in Japan, and the regional server 3C may be a server providing the service A in the United States of America.

In addition, the regional servers 3 may be installed for respective different regions in a same country. For example, the regional server 3D may provide service in the Kanto region, and the regional server 3E may provide service in the Kansai region.

Further, the regional servers 3, 3, . . . may not be provided so as to correspond to predetermined regions, but may be provided so as to correspond to frameworks convenient from a viewpoint of management in providing services or the like.

The user terminals 4 are information processing devices used by users receiving various kinds of services described above, and are for example personal computers (PCs), feature phones, or personal digital assistants (PDAs) or smart devices such as smart phones, tablet terminals, or the like having a communicating function. The user terminals 4 perform processing of accessing to a web page provided by a regional server 3, information transmission processing in response to an operation of inputting a user ID and a login password for logging in to the regional server 3, and the like. In the following description, a user ID and a login password will be described collectively as login information.

A master database (DB) 100 is a database storing the user registration information managed by the master server 1. That is, the master DB 100 stores the user registration information of users receiving the services provided by the respective regional servers 3.

User DBs 300a, 300b, . . . are databases managed by the regional servers 3A and 3B . . . . The user DBs 300a, 300b, . . . store the user registration information of users receiving the services provided by the respective regional servers 3. As will be described later in detail, the user DBs 300a, 300b, . . . may each also store a part of information of a user receiving service provided by another regional server 3. Specifically, for example, a DB storing the user registration information of a user receiving service provided by the regional server 3A is the user DB 300a, and a DB storing the user registration information of a user receiving service provided by the regional server 3B is the user DB 300b. The user DB 300a also stores a part of the user registration information of the user receiving the service provided by the regional server 3B together with the user registration information of the user receiving the service provided by the regional server 3A.

Figure 2:
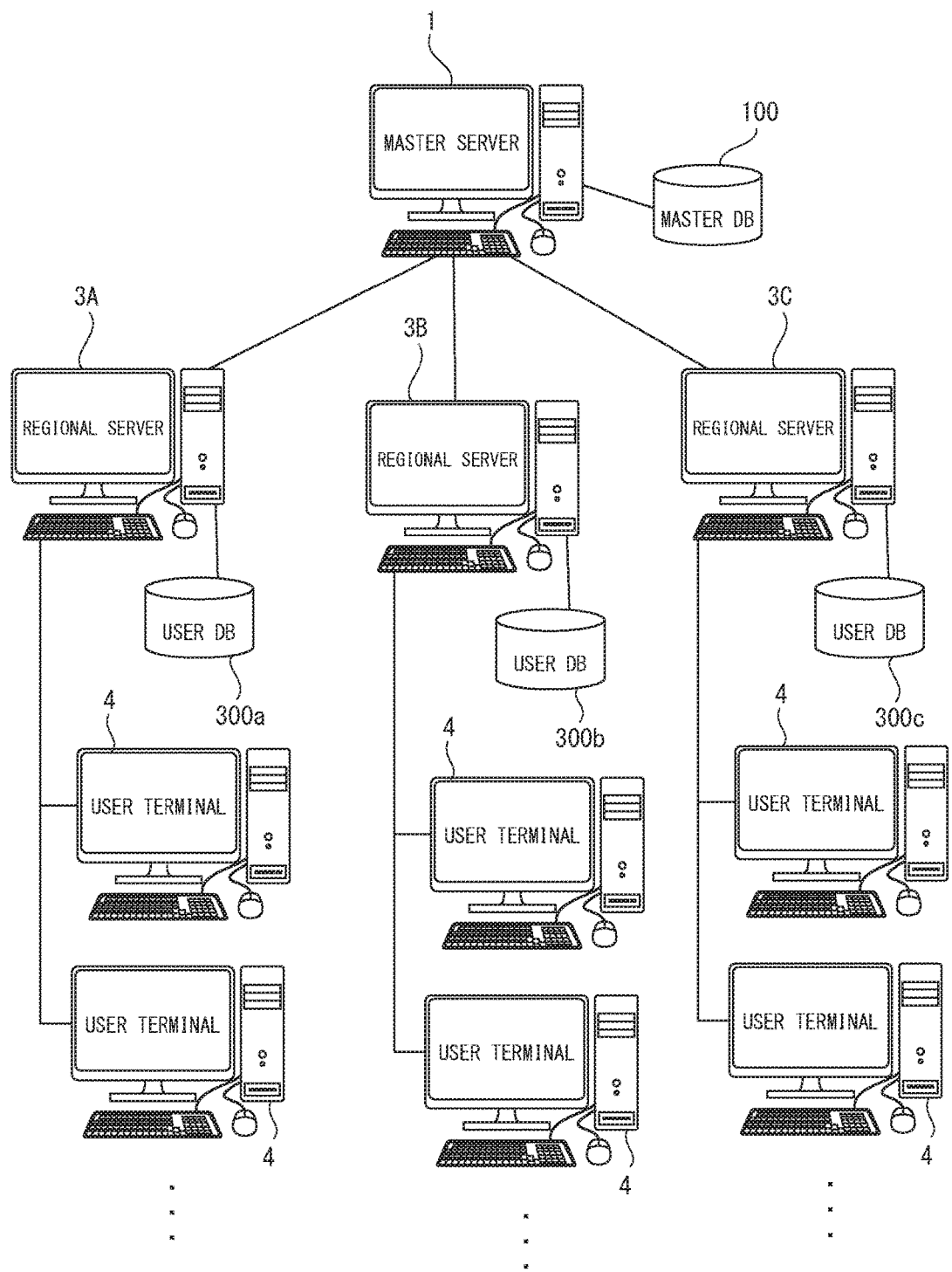
FIG. 2 is a diagram depicting the general configuration of the present embodiment by another method.

FIG. 2 is a diagram hierarchically depicting the master server 1, the regional servers 3, the user terminals 4, the master DB 100, and the user DBs 300. The information processing devices and the DBs have a data structure with the master server 1 as a highest node, and the regional servers 3 are managed by the master server 1. In addition, the user terminals 4 are managed by the respective regional servers 3, and some user terminals 4 may each be managed by a plurality of regional servers 3. Further, while a parent node of the regional servers 3 is the master server 1 in FIG. 2, the parent node may be another regional server 3. Specifically, the master server 1 may manage the regional server 3A managing users in Japan and the regional server 3B managing users in the United States of America, and the regional server 3A may manage the regional server 3C managing users in eastern Japan and the regional server 3D managing users in western Japan.

Figure 3:
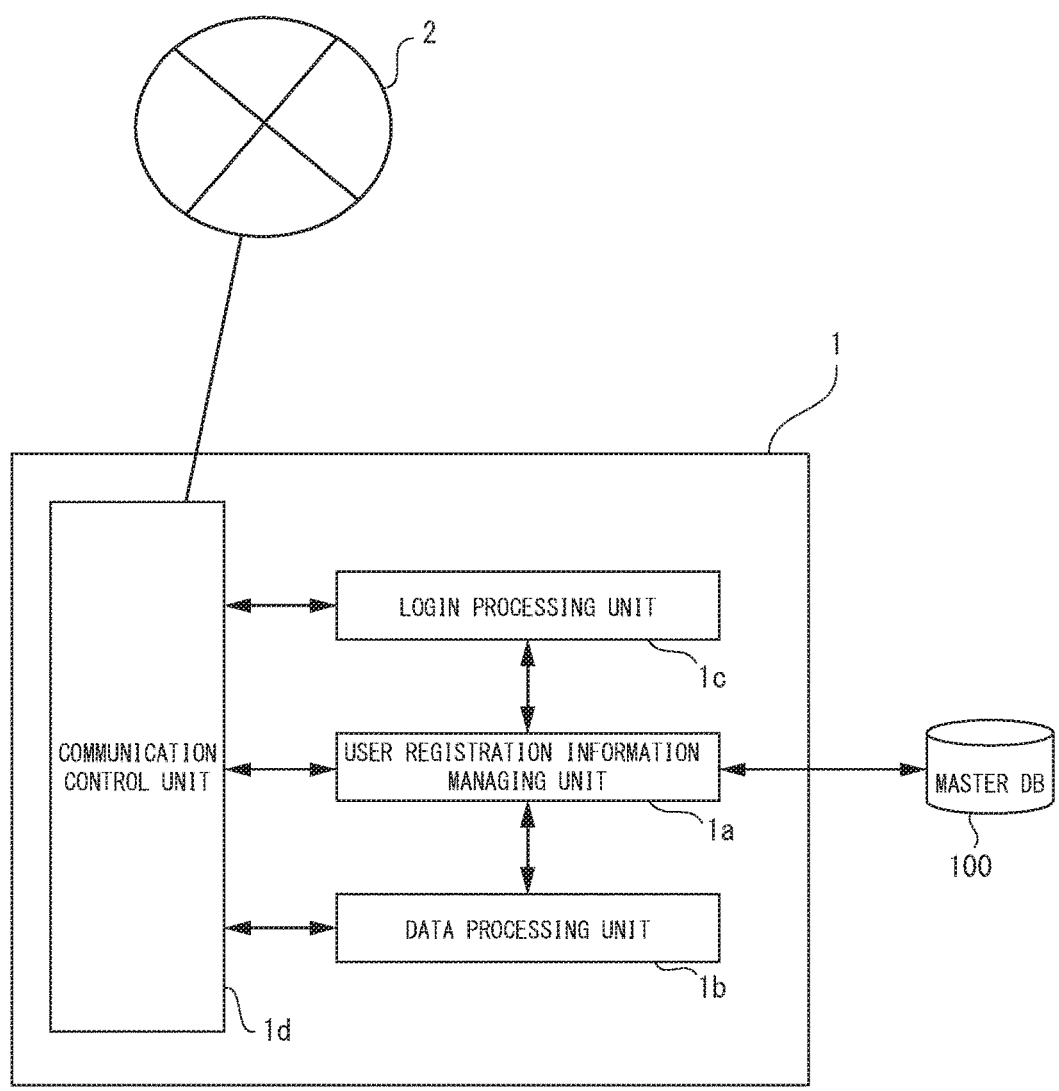
FIG. 3 is a block diagram of a master server according to the present embodiment.

As depicted in FIG. 3, the master server 1 includes a user registration information managing unit 1*a*, a data processing unit 1*b*, a login processing unit 1*c*, and a communication control unit 1*d*.

The user registration information managing unit 1*a* has a function of managing, as master data, the user registration information managed by each of the regional servers 3 that are directly or indirectly managed by the master server 1. Concrete processing performed by the user registration information managing unit 1*a* includes a function of obtaining the user registration information of managed users from the master DB 100 and master data registration processing of storing user registration information transmitted from each regional server 3 into the master DB 100. In addition, when processing of changing user registration information is performed in each regional server 3, the user registration information managing unit 1*a* performs master data update processing of updating the user registration information of the corresponding user, which user registration information is stored in the master DB 100, on the basis of reception of the user registration information after being changed.

The user registration information managing unit 1*a* functions as a registration information obtaining unit described in claims.

The data processing unit 1*b* performs incomplete attribute information generation processing of generating incomplete attribute information X and complementary attribute information Y from user attribute information. The incomplete attribute information X is data manipulated such that the user attribute information is not obtained from only the incomplete attribute information X, and is for example information obtained by removing a predetermined bit (or a few bits to a few ten bits or the like) from the user attribute information. The complementary attribute information Y is data enabling the user attribute information to be reconstructed when reconstruction processing is performed by combining the complementary attribute information Y with the incomplete attribute information X. The complementary attribute information Y is for example the predetermined bit (or the few bits to the few ten bits or the like) removed from the user attribute information.

The data processing unit 1*b* functions as a data generating unit described in claims.

The login processing unit 1*c* performs login information checking processing when the master server 1 receives a complementary attribute information transmission request from a regional server 3. Specifically, when the regional server 3 needs user attribute information, the regional server 3 requests the transmission of the complementary attribute information Y of the attribute information from the master server 1. In response to this, the login processing unit 1 performs checking processing for determining whether or not a user ID and a login password received from the regional server 3 are correct.

The communication control unit 1*d* performs incomplete user information transmission processing of transmitting a user ID, a login password, and incomplete attribute information X to a regional server 3. In the following description, a user ID, a login password, and incomplete attribute information X associated with one user will be described as incomplete user information.

The communication control unit 1*d* functions as a transmission processing unit described in claims. Incidentally, both of the user registration information managing unit 1*a* and the communication control unit 1*d* may be used to implement the transmission processing unit.

The master DB 100 storing the user information managed by the master server 1 is connected to the master server 1 so as to allow access from at least the user registration information managing unit 1*a*.

Figure 4:
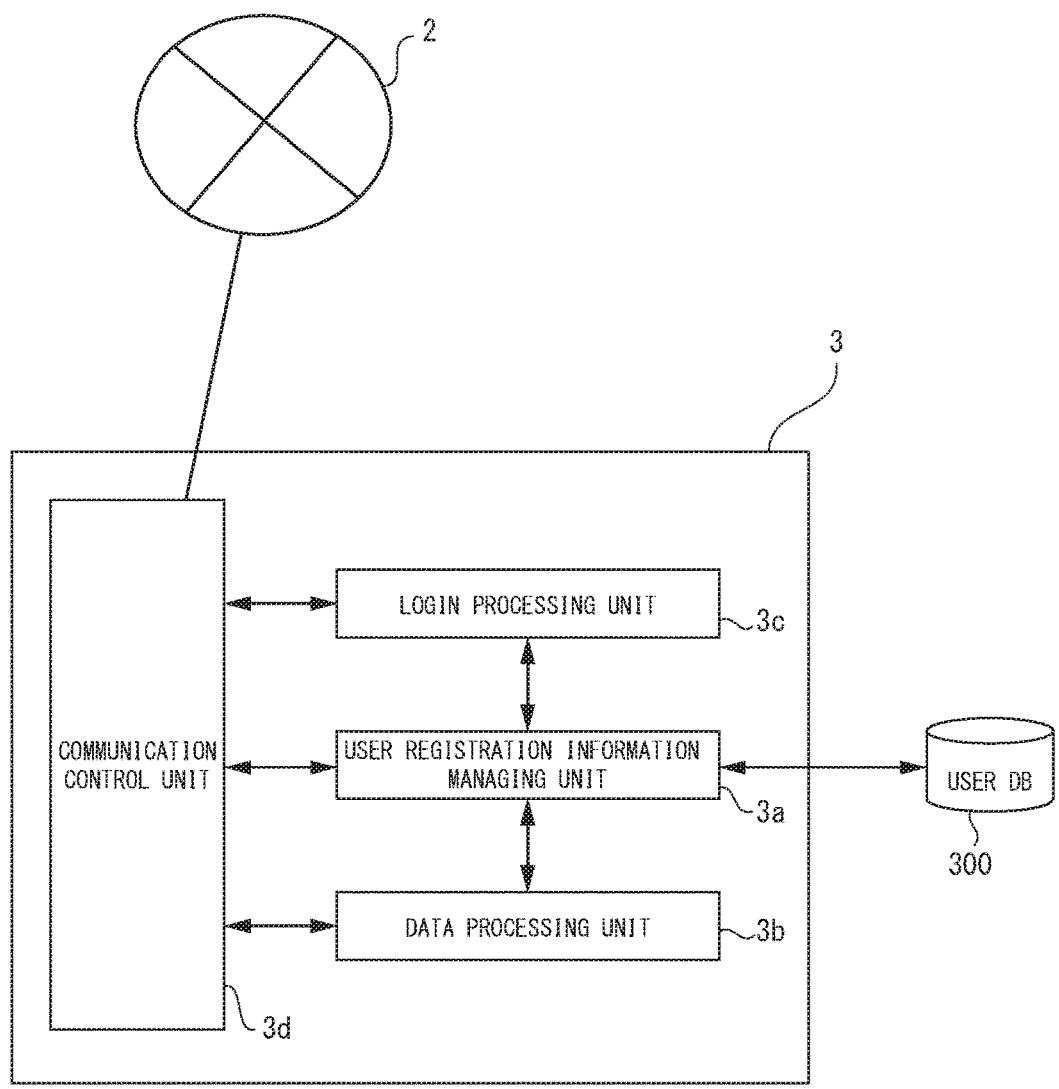
FIG. 4 is a block diagram of a regional server according to the present embodiment.

As depicted in FIG. 4, the regional server 3 includes a user registration information managing unit 3*a*, a data processing unit 3*b*, a login processing unit 3*c*, and a communication control unit 3*d*. That is, the configuration of the units is similar to that of the master server 1.

The user registration information managing unit 3*a* has a function of managing user registration information managed by the regional server 3. Specifically, the user registration information managing unit 3*a* for example performs incomplete user information storage processing of storing incomplete user information and complementary attribute information Y (to be described later in detail) received from the master server 1 into the user DB 300 in association with a user ID.

The user registration information managing unit 3*a* also performs registration processing of storing user registration information input on a user terminal 4 into the user DB 300 when a user other than users managed by the master server 1, that is, a new user not managed by any of the regional servers 3, 3, . . . managed by the master server 1 requests user registration to receive service.

Further, in each regional server 3, when user registration information is changed, update processing is performed which updates the user registration information of a corresponding user, which user registration information is stored in the user DB 300, on the basis of reception of the user registration information after being changed. The user registration information after being changed is directly transmitted from the user terminal 4 to the regional server 3, or transmitted from the master server 1.

Furthermore, when a user managed by the master server 1 but not receiving the service provided by the regional server 3 performs an operation of logging in to the regional server 3, the user registration information managing unit 3*a* performs complementary information requesting processing of requesting the transmission of complementary attribute information Y related to the user from the master server 1.

The user registration information managing unit 3*a* functions as a managing unit described in claims.

The data processing unit 3*b* performs reconstruction processing of reconstructing the attribute information of the user by using incomplete attribute information X of the user which incomplete attribute information X is obtained via the user registration information managing unit 3*a* and the complementary attribute information Y obtained from the master server 1.

The data processing unit 3*b* functions as a reconstruction processing unit described in claims.

When there is access from a user terminal 4, the login processing unit 3*c* performs registration screen presentation processing of presenting a user registration screen in a case where a user making the access using the user terminal 4 is a new user whose user registration information is not stored in the master server 1, and the login processing unit 3*c* performs login screen presentation processing of presenting a login screen in a case of a user whose user registration information is stored in the master server 1. Incidentally, a screen allowing both of login operation and user registration operation may be presented as a screen that the login processing unit 3c presents to the user terminal 4.

In addition, the login processing unit 3c performs login authentication processing of performing login authentication and input information confirmation processing of confirming whether various kinds of data input on the user registration screen for the new user are not invalid.

When the new user performs user registration operation for the regional server 3, the communication control unit 3d performs user information transmission processing of transmitting input user information to the master server 1.

Also when the user already registered in the master server 1 changes the user registration information, the communication control unit 3d performs user information transmission processing to transmit the latest user registration information to the master server 1.

The user DB 300 storing the user information managed by the regional server 3 is connected to the regional server 3 so as to allow access from at least the user registration information managing unit 3a. Incidentally, when the regional servers 3A, 3B, . . . are present in the following description, the user DB 300 corresponding to the regional server 3A will be described as the user DB 300a, and the user DB 300 corresponding to the regional server 3B will be described as the user DB 300b. In addition, when one of the user DBs 300a, 300b, . . . is referred to without the user DBs 300a, 300b, . . . being distinguished from each other, the user DB will be described as a user DB 300.

2. INCOMPLETE ATTRIBUTE INFORMATION AND COMPLEMENTARY ATTRIBUTE INFORMATION

2-1. First Embodiment

A few embodiments are conceivable for incomplete attribute information X and complementary attribute information Y generated from attribute information of each user. In a first embodiment, one piece of incomplete attribute information X and one piece of complementary attribute information Y are generated for one user. Specifically, from attribute information of a user U1, incomplete attribute information U1X (incomplete attribute information X of the user U1) and complementary attribute information U1Y (complementary attribute information Y of the user U1) are generated, and from attribute information of a user U2, incomplete attribute information U2X and complementary attribute information U2Y are generated.

Description will next be made of the incomplete attribute information X and the complementary attribute information Y stored in the master DB 100 and the user DBs 300. Specifically, an example will be cited in which the user U1 is receiving only the service A provided by the regional server 3A and is not receiving the service B provided by the regional server 3B, for example.

Figure 5A:
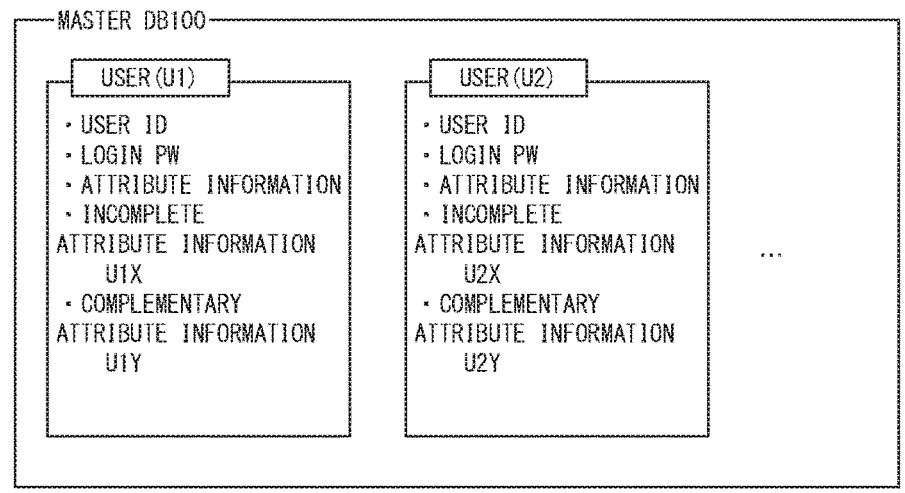
FIGS. 5A and 5B are diagrams depicting an example of information stored in a master DB and user DBs.

In this case, as depicted in FIG. 5A, the master DB 100 stores the incomplete attribute information U1X and the complementary attribute information U1Y in association with the user ID of the user U1. The master DB 100 also stores the incomplete attribute information U2X and the complementary attribute information U2Y in association with the user ID of the user U2.

Figure 5B:
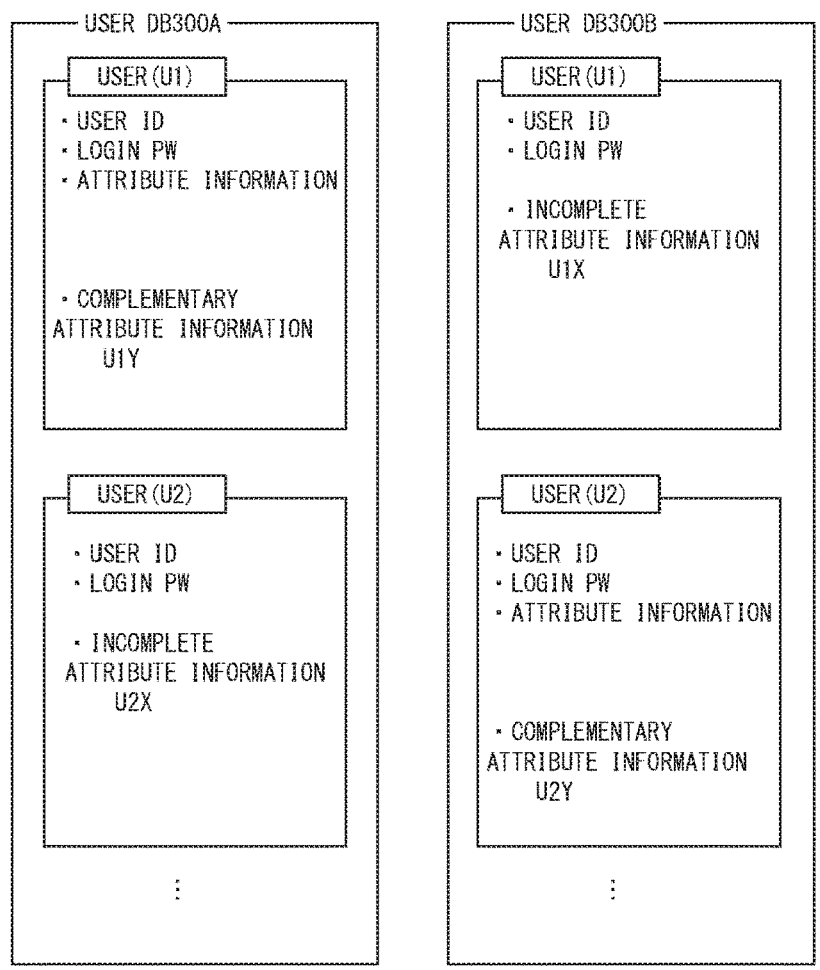

In addition, as depicted in FIG. 5B, the user DB 300a managed by the regional server 3A stores the attribute information and the complementary attribute information U1Y in association with the user ID of the user U1. Further, the user DB 300b managed by the regional server 3B stores the incomplete attribute information U1X in association with the user ID of the user U1.

2-2. Second Embodiment

In a second embodiment, a plurality of sets of incomplete attribute information X and complementary attribute information Y are generated for some users. For example, incomplete attribute information X1 and complementary attribute information Y1, incomplete attribute information X2 and complementary attribute information Y2, and incomplete attribute information X3 and complementary attribute information Y3 are generated from one piece of attribute information. In this case, user attribute information cannot be reconstructed by combining the incomplete attribute information X1 with the complementary attribute information Y2 or the complementary attribute information Y3, but the user attribute information can be reconstructed only by combining the incomplete attribute information X1 with the complementary attribute information Y1. In addition, in a case where the plurality of combinations of incomplete attribute information X and complementary attribute information Y are generated, information that can identify the pieces of incomplete attribute information may be added to the pieces of incomplete attribute information X1, X2, and X3. Similarly, information that can identify the pieces of complementary attribute information may also be added to the pieces of complementary attribute information Y1, Y2, and Y3.

The communication control unit 1d in incomplete user information transmission processing may transmit complementary attribute information Y corresponding to incomplete attribute information X transmitted to another regional server 3 together with incomplete user information. Specifically, when the regional servers 3A and 3B are present, the communication control unit 1d transmits a user ID, a login password, the incomplete attribute information X1, and the incomplete attribute information Y2 to the regional server 3A, and transmits the user ID, the login password, the incomplete attribute information X2, and the incomplete attribute information Y1 to the regional server 3B.

Specifically, for example, suppose that the user U1 is a user receiving only the service provided by the regional server 3A, and that the user U2 is a user receiving the respective services provided by the regional servers 3B and 3C.

In incomplete attribute information generation processing performed by the data processing unit 1b, incomplete attribute information U1X1 and U1X2 and complementary attribute information U1Y1 and U1Y2 are generated from the attribute information of the user U1. In addition, incomplete attribute information U2X1 and complementary attribute information U2Y1 are generated from the attribute information of the user U2.

Figure 6A:
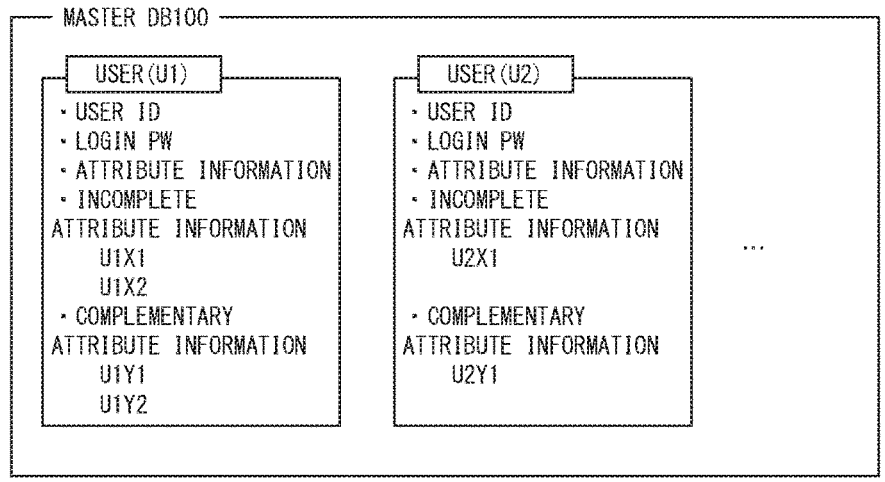
FIGS. 6A and 6B are diagrams depicting another example of the information stored in the master DB and the user DBs.

Hence, as depicted in FIG. 6A, the master DB 100 stores user IDs, login passwords, and the attribute information in association with the respective users, and stores the incomplete attribute information X and the complementary attribute information Y generated from the attribute information of the users in association with the user IDs of the users. Thus, the incomplete attribute information U1X1 and U1X2 and the complementary attribute information U1Y1 and U1Y2 are stored in association with the user ID of the user U1. In addition, the incomplete attribute information U2X1 and the complementary attribute information U2Y1 are stored in association with the user ID of the user U2.

Further, the communication control unit 1d in the incomplete user information transmission processing transmits the complementary attribute information U1Y1 and U1Y2 related to the user U1 and the incomplete attribute information U2X1 related to the user U2 to the regional server 3A. The complementary attribute information U1Y1 and U1Y2 related to the user U1 and the incomplete attribute information U2X1 related to the user U2 are stored in the user DB 300a. In addition, the incomplete attribute information U1X1 and the complementary attribute information U1Y2 related to the user U1 and the complementary attribute information U2Y1 related to the user U2 are transmitted to the regional server 3B, and are stored in the user DB 300b. Further, the incomplete attribute information U1X2 and the complementary attribute information U1Y1 related to the user U1 and the complementary attribute information U2Y1 related to the user U2 are transmitted to the regional server 3C, and are stored in the user DB 300c.

Figure 6B:
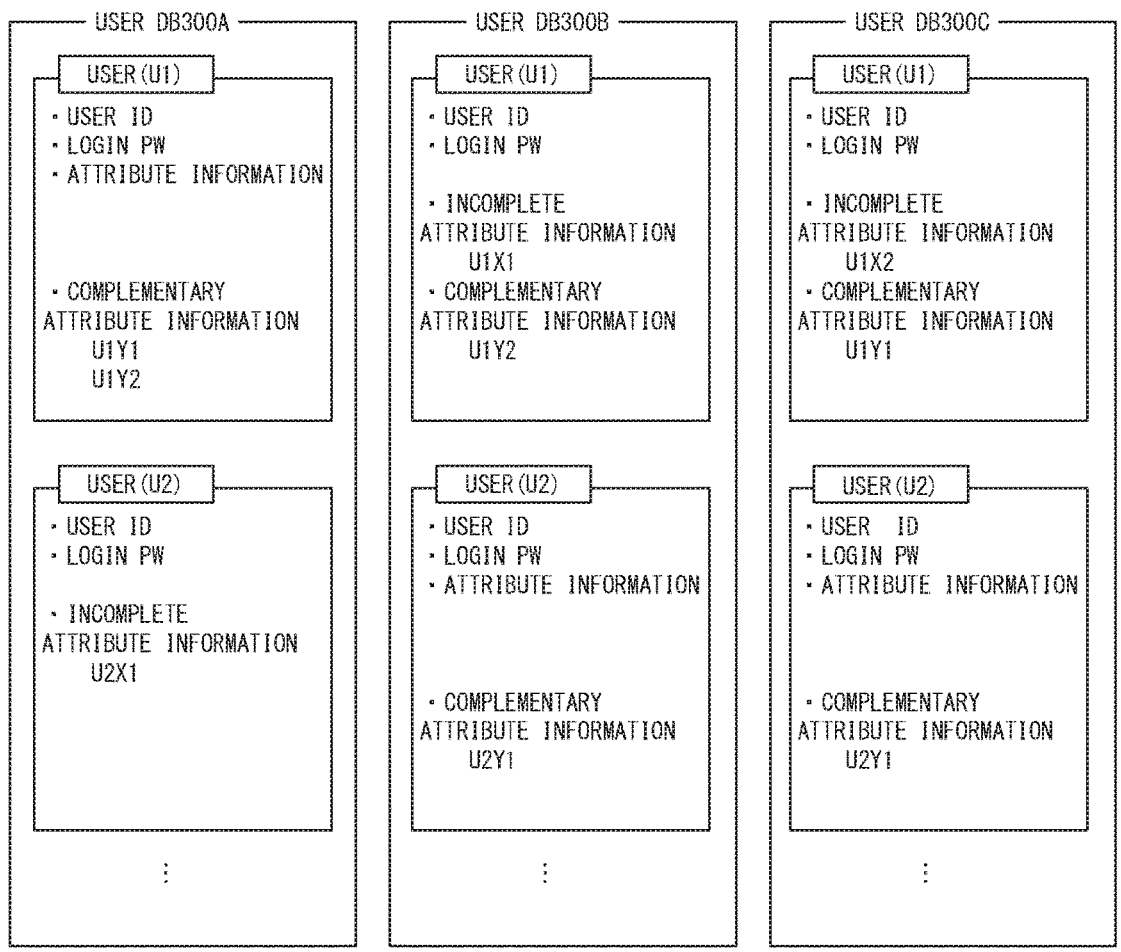

That is, as depicted in FIG. 6B, the respective user DB 300a managed by the regional server 3A, user DB 300b managed by the regional server 3B, and user DB 300c managed by the regional server 3C selectively store the attribute information, the incomplete attribute information X, and the complementary attribute information Y together with the user IDs and the login passwords of the respective users.

In addition, when a regional server 3 performs complementary information requesting processing of requesting the transmission of complementary attribute information Y from the master server 1, the regional server 3 transmits information that identifies incomplete attribute information X retained by the regional server 3 as one of the pieces of incomplete attribute information X1, X2, . . . to the master server 1 together with login information. The master server 1 can therefore identify the complementary attribute information Y to be transmitted to the regional server 3.

Incidentally, in the first embodiment and the second embodiment, the master DB 100 may not store the incomplete attribute information X. This is because the master DB 100 does not use the incomplete attribute information X after transmitting the incomplete attribute information X to the respective regional servers 3. In addition, even when the incomplete attribute information X may be used, it suffices to generate the incomplete attribute information X by performing incomplete attribute information generation processing again.

In the following description, when incomplete attribute information is referred to without any of the pieces of incomplete attribute information U1X1, U1X2, U1X, and the like being identified, the incomplete attribute information will be described as incomplete attribute information X. Similarly, when complementary attribute information is referred to without any of the pieces of complementary attribute information U1Y1, U1Y2, U1Y, and the like being identified, the complementary attribute information will be described as complementary attribute information Y.

3. HARDWARE CONFIGURATION

Figure 7:
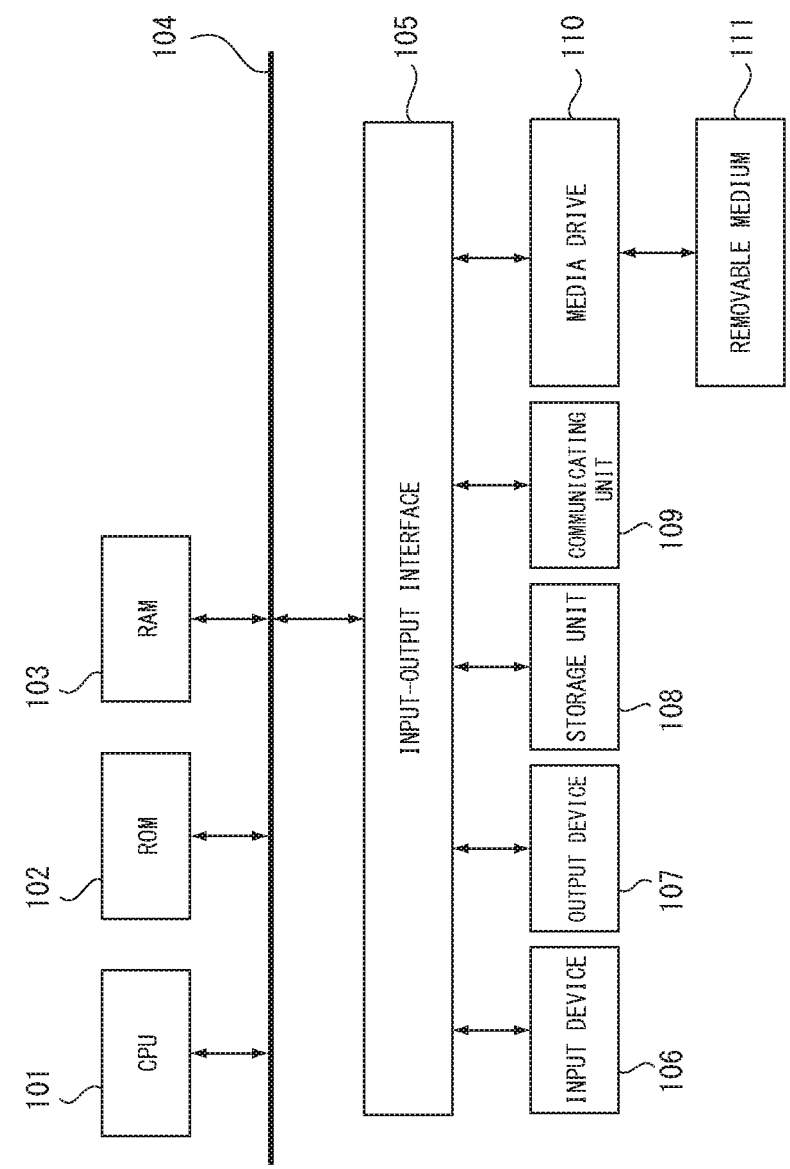
FIG. 7 is a block diagram of a computer according to the present embodiment.

FIG. 7 is a diagram illustrating hardware of the master server 1, the regional servers 3, and the user terminals 4 depicted in FIGS. 1 to 4. A central processing unit (CPU) 101 of a computer device in each of the servers and the terminals performs various kinds of processing according to a program stored in a read only memory (ROM) 102 or a program loaded from a storage unit 108 into a random access memory (RAM) 103. The RAM 103 also stores data and the like necessary when the CPU 101 performs various kinds of processing as appropriate.

The CPU 101, the ROM 102, and the RAM 103 are interconnected via a bus 104. An input-output interface 105 is also connected to the bus 104.

The input-output interface 105 is connected with an input device 106 constituted of a keyboard, a mouse, a touch panel, and the like, an output device 107 constituted of a display formed by a liquid crystal display (LCD), a cathode ray tube (CRT), an organic electroluminescence (EL) panel, or the like as well as a speaker or the like, a storage unit 108 formed by a hard disk drive (HDD), a flash memory device, and the like, and a communicating unit 109 that performs communication processing via the communication network 2 and inter-device communication.

The input-output interface 105 is also connected with a media drive 110 as required. A removable medium 111 such as a magnetic disk, an optical disk, a magneto-optical disk, a semiconductor memory, and the like is inserted into the media drive 110 as appropriate to write or read information to and from the removable medium 111.

Such a computer device can upload and download data and programs through communication by the communicating unit 109, and transfer data and programs via the removable medium 111.

When the CPU 101 performs processing operation on the basis of various kinds of programs, information processing and communication to be described later are performed in each of various kinds of information processing devices such as the master server 1 and the like, the regional servers 3, and the user terminals 4.

Incidentally, each of information processing devices constituting various kinds of information processing devices such as the master server 1 and the like, the regional servers 3, and the user terminals 4 is not limited to the configuration of a single computer device as in FIG. 7, but may be configured by forming a plurality of computer devices into a system. The plurality of computer devices may be formed into a system by a LAN or the like, or may be arranged at remote places on a VPN using the Internet or the like.

4. FLOW OF PROCESSING

4-1. Example of Processing in New User Registration

An example of processing in new user registration will be described with reference to FIG. 8.

New user registration is processing of registering user information so that a user whose user registration information is not stored in the master DB 100 managed by the master server 1 receives service provided by one of the regional servers 3 managed by the master server 1. Specific description will be made of a case where the user U1 receiving neither of the service A provided by the regional server 3A and the service B provided by the regional server 3B performs new user registration via the regional server 3A to receive the service A.

First, when the user U1 performs an operation of accessing to the regional server 3A by using the user terminal 4 in step S101, the login processing unit 3c of the regional server 3A performs registration screen presentation processing in step S201.

Next, when the user U1 performs an operation of inputting information of the user U1 himself/herself to a registration screen displayed on the user terminal 4 in step S102, the login processing unit 3c of the regional server 3A performs input information confirmation processing in step S202. As described earlier, the input information confirmation processing confirms whether various kinds of input data are not invalid. Invalid data is for example a zip code, a mobile telephone number, or the like that does not exist.

When it is determined in step S202 that the input information is not invalid, the user registration information managing unit 3a of the regional server 3A in step S203 performs new user registration processing of registering the information (a user ID, a login password, and attribute information) of the user U1, which information is received from the user terminal 4, as user registration information in the user DB 300a.

Next, the communication control unit 3d of the regional server 3A in step S204 performs user information transmission processing of transmitting the user registration information of the user U1 to the master server 1.

In step S301, the user registration information managing unit 1a of the master server 1 that receives the user registration information of the user U1 performs master data registration processing of storing the user registration information of the user U1 as master data into the master DB 100. Incidentally, a user receiving a plurality of services may be stored as a global user in the master DB 100, and a user receiving only a single service may be stored as a local user in only the user DB 300 managed by the corresponding regional server 3.

Next, the data processing unit 1b of the master server 1 in step S302 performs incomplete attribute information generation processing of generating incomplete attribute information X and complementary attribute information Y from the attribute information of the user U1. Next, the communication control unit 1d of the master server 1 in step S303 performs incomplete user information transmission processing directed to the regional servers 3A and 3B. The complementary attribute information Y is transmitted in the incomplete user information transmission processing directed to the regional server 3A that already manages the user ID, the login password, and the attribute information of the user U1 in steps S201 to S203. In the incomplete user information transmission processing directed to the regional server 3B that does not at all manage the information of the user U1, the user ID, the login password, and the incomplete attribute information X are transmitted as incomplete user information. Thus, the regional server 3B obtains the user ID and the login password as information necessary for login, and obtains user attribute information as incomplete information (incomplete attribute information X).

In response to the incomplete user information transmission processing of step S303, the user registration information managing unit 3a of the regional server 3A in step S205 performs incomplete user information storage processing of storing the received complementary attribute information Y into the user DB 300a, and the user registration information managing unit 3a of the regional server 3B in step S401 performs incomplete user information storage processing of storing the received incomplete user information into the user DB 300b.

Figure 8:
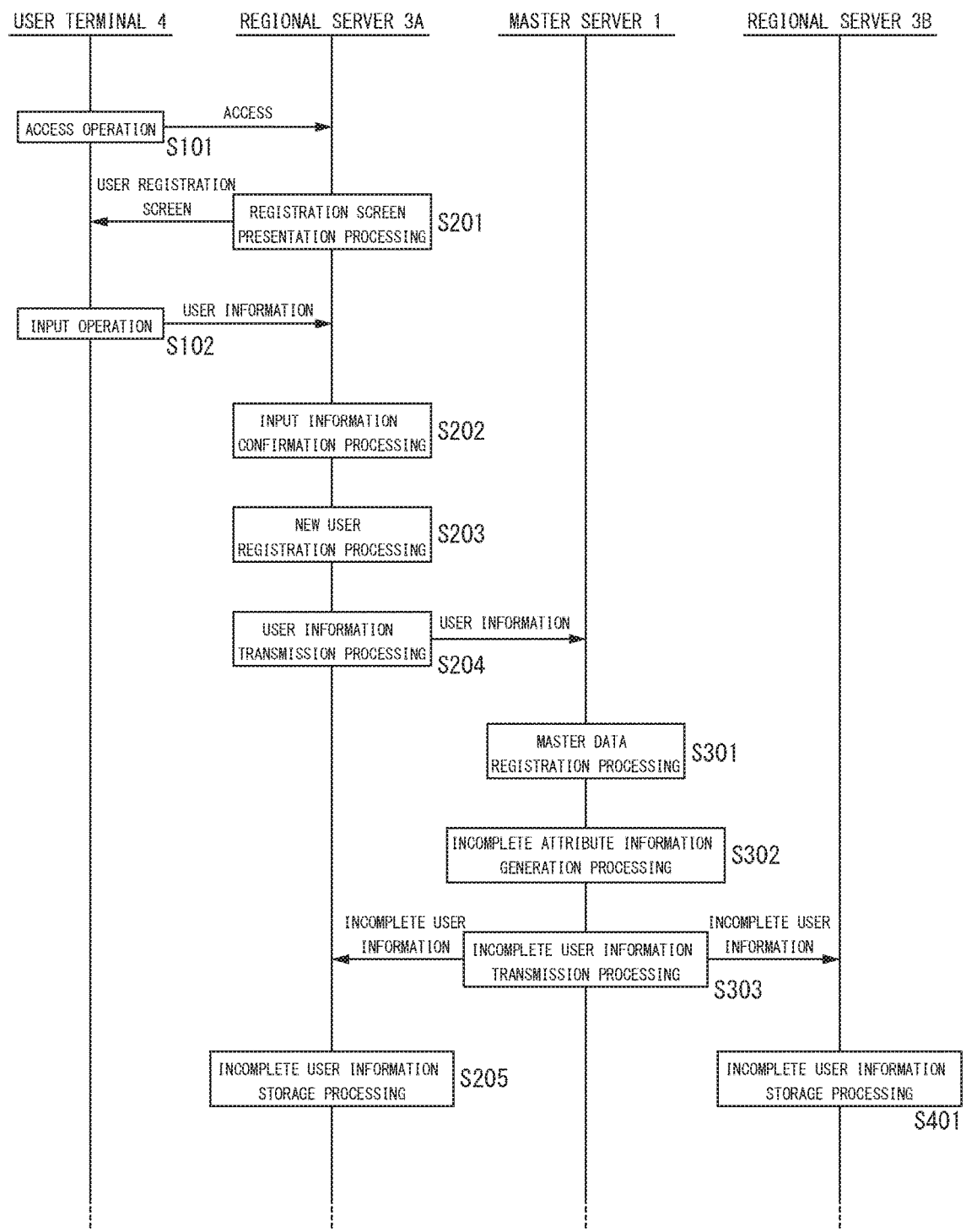
FIG. 8 is a diagram depicting an example of processing in new user registration.

As a result of performing the series of processing depicted in FIG. 8 in the master server 1 and the regional servers 3A and 3B, the information of the user U1 which information is input on the user terminal 4 is stored in each of the master DB 100 and the user DBs 300a and 300b. In this case, the user DB 300a managed by the regional server 3A providing the service A received by the user U1 and the master DB 100 managed by the master server 1 store complete user information as user registration information and master data, and the user DB 300b managed by the regional server 3B providing the service B not received by the user U1 stores incomplete user information. The complementary attribute information Y is stored in the master DB 100, and is further stored in the user DB 300a as required.

4-2. Example of Processing in Changing User Registration Information

An example of processing in changing user registration information will be described with reference to FIG. 9.

Specific description will be made of processing in a case where the user U1 receiving the service A provided by the regional server 3A updates the user registration information stored in the user DB 300a via the regional server 3A.

First, when the user U1 performs an operation of accessing to the regional server 3A by using the user terminal 4 in step S501, the login processing unit 3c of the regional server 3A performs login screen presentation processing in step S601.

Next, when the user U1 performs an operation of inputting login information to a login screen displayed on the user terminal 4 in step S502, the login processing unit 3c of the regional server 3A performs login authentication processing in step S602. The login authentication processing determines whether the login information received from the user terminal 4 matches information stored in the user DB 300a. When authentication succeeds, a login permission notification is transmitted from the regional server 3A to the user terminal 4. A Web page specific to the user U1 such as a user page or the like may be transmitted in place of this notification.

Next, in response to a user information changing operation performed by the user U1 using the user terminal 4 in step S503, the user registration information managing unit 3a of the regional server 3A in step S603 performs update processing of updating the user registration information of the user U1 which user registration information is stored in the user DB 300a. Then, the communication control unit 3d in step S604 performs user information transmission processing of transmitting the user registration information updated by the user U1 to the master server 1.

In step S701, the user registration information managing unit 1a of the master server 1 that receives the user registration information of the user U1 from the regional server 3A performs master data update processing of updating the master data of the user U1 which master data is stored in the master DB 100 on the basis of the received user registration information of the user U1.

Next, the data processing unit 1b of the master server 1 in step S702 performs incomplete attribute information generation processing of generating incomplete attribute information X and complementary attribute information Y from the attribute information of the user U1.

Next, the communication control unit 1d of the master server 1 performs processing of transmitting the latest information of the user U1 to the regional servers 3B and 3C. Specifically, the communication control unit 1d in step S703 performs incomplete user information transmission processing of transmitting the user ID, the login password, and the incomplete attribute information X of the user U1 to the regional server 3B providing the service B not received by the user U1. In addition, the communication control unit 1d in step S704 performs user information transmission processing of transmitting the user ID, the login password, and the attribute information of the user U1 to the regional server 3C providing the service C already received by the user U1. This user information transmission processing also transmits the complementary attribute information Y as required. The user information transmission processing of step S704 for transmitting the complementary attribute information Y may be further performed for the regional server 3A.

Incidentally, only updated information in the user registration information of the user U1 may be transmitted in steps S703 and S704. In this case, information identifying the user is added and transmitted.

In response to the incomplete user information transmission processing of step S703, the user registration information managing unit 3a of the regional server 3B performs incomplete user information storage processing in step S801. The incomplete user information storage processing stores the received new incomplete user information of the user U1 into the user DB 300b.

In addition, in response to the user information transmission processing of step S704, the user registration information managing unit 3a of the regional server 3C performs user information storage processing in step S901. The user information storage processing stores the received new information of the user U1 as user registration information into the user DB 300c.

Incidentally, in a case where the complementary attribute information Y is not transmitted in the user information transmission processing of step S704, the processing of step S704 may be performed before the incomplete attribute information generation processing of step S702.

Figure 9:
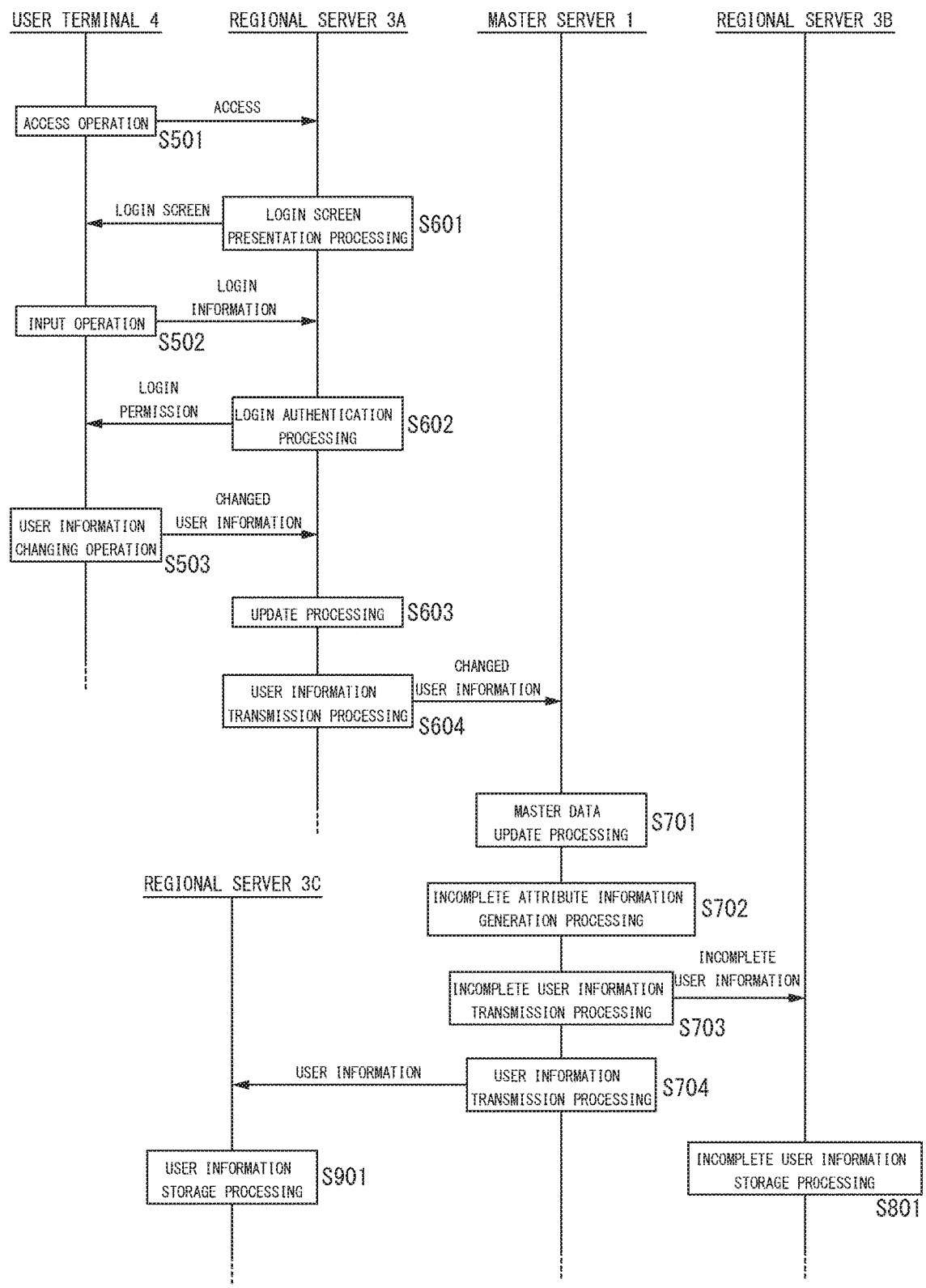
FIG. 9 is a diagram depicting an example of processing in changing user registration information.

As a result of performing the series of processing depicted in FIG. 9 in the master server 1 and the regional servers 3A, 3B, and 3C, the new information of the user U1 which new information is input by using the user terminal 4 is stored in each of the master DB 100 and the user DBs 300a, 300b, and 300c. In this case, the user DBs 300a and 300c and the master DB 100 respectively managed by the regional servers 3A and 3C providing the services already received by the user U1 and the master server 1 store complete user information as user registration information and master data. Further, the user DB 300b managed by the regional server 3B providing the service B not received by the user U1 stores incomplete user information. The complementary attribute information Y is stored in the master DB 100, and is stored also in the user DBs 300a and 300c as required.

4-3. First Example of Processing in Receiving New Service

Figure 10:
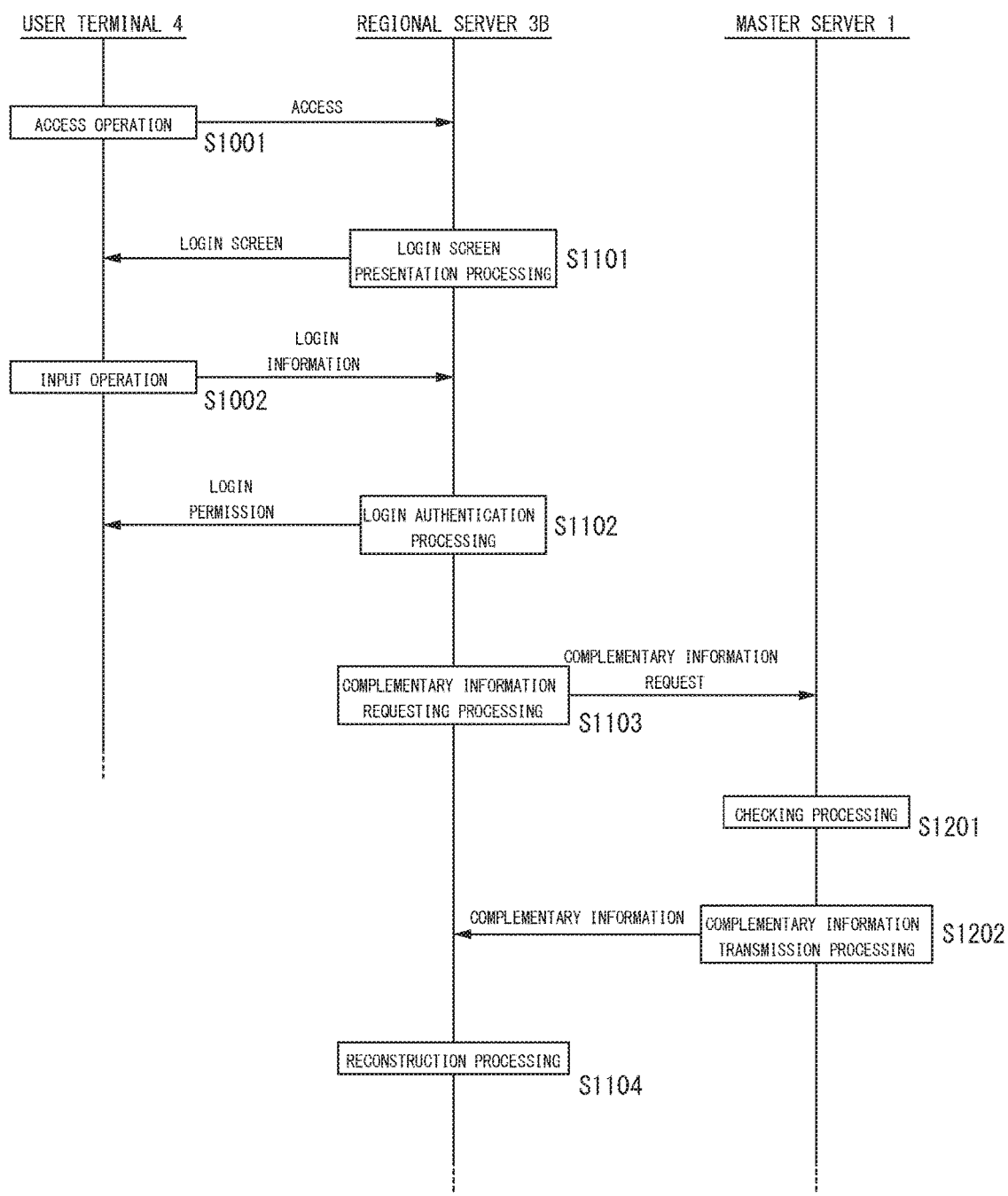
FIG. 10 is a diagram depicting a first example of processing in a case where a new service is received.

Referring to FIG. 10, description will be made of a first example of processing in a case where a user receiving the service provided by one of the regional servers 3A, 3B, . . . managed by the master server 1 further receives a new service.

Specific description will be made of processing in a case where the user U1 already receiving the service A provided by the regional server 3A receives anew the service B provided by the regional server 3B.

First, when the user U1 performs an operation of accessing to the regional server 3B by using the user terminal 4 in step S1001, the login processing unit 3c of the regional server 3B performs login screen presentation processing in step S1101.

Next, when the user U1 performs an operation of inputting login information to a login screen displayed on the user terminal 4 in step S1002, the login processing unit 3c of the regional server 3B performs login authentication processing in step S1102. The login authentication processing determines whether the login information received from the user terminal 4 matches information stored in the user DB 300b. In addition, when authentication succeeds, the login authentication processing determines whether or not the user U1 is a user using the service B provided by the regional server 3B. In a case where the user U1 is a user using the service B, the regional server 3B performs for example processing of displaying a user page on the user terminal 4. In a case where the user U1 is not a user using the service B as in the present processing example, the regional server 3B transmits a login permission notification to the user terminal 4, and the user registration information managing unit 3a performs complementary information requesting processing in step S1103. The complementary information requesting processing requests, from the master server 1, the transmission of the complementary attribute information Y corresponding to the incomplete attribute information X of the user U1 which incomplete attribute information X is stored in the user DB 300b.

Next, the login processing unit 1c of the master server 1 that receives a complementary information request performs checking processing in step S1201. When it is determined that there is no problem with the received complementary information request, the communication control unit 1d next performs complementary information transmission processing in step S1202.

The data processing unit 3b of the regional server 3B that receives the complementary attribute information Y as a result of the complementary information transmission processing performs reconstruction processing of reconstructing the attribute information of the user U1 in step S1104.

As a result of performing the series of processing depicted in FIG. 10 in the master server 1 and the regional server 3B, the regional server 3B receives the complementary attribute information Y from the master server 1 when the user U1 uses anew the service B provided by the regional server 3B. At this time, the user U1 does not need to input the attribute information again, and the complementary attribute information Y small in data volume is received, the complementary attribute information Y being generated from the attribute information of the user U1 managed by the master server 1.

4-4. Second Example of Processing in Receiving New Service

Figure 11:
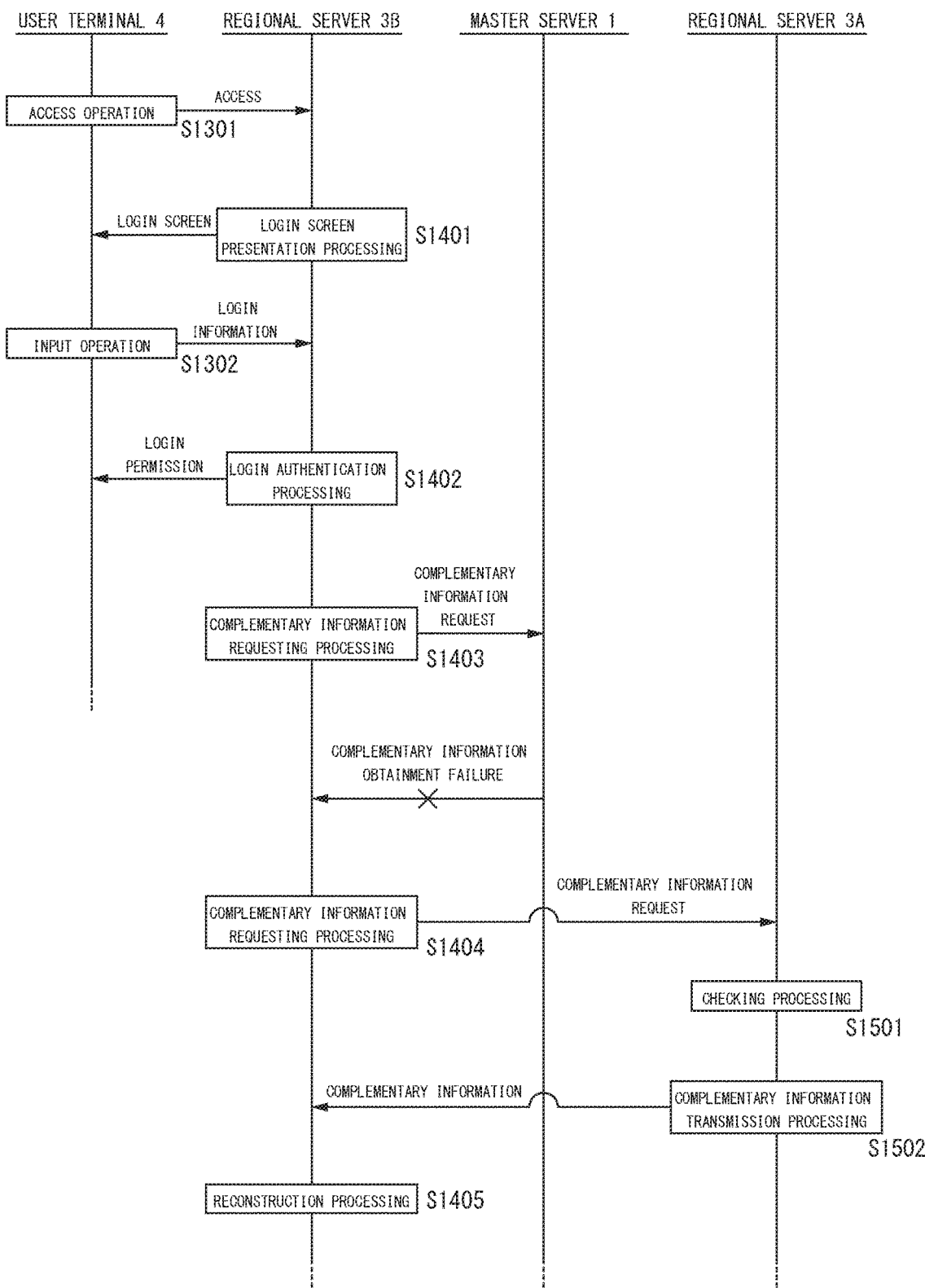
FIG. 11 is a diagram depicting a second example of the processing in the case where the new service is received.

Referring to FIG. 11, description will be made of a second example of processing in a case where a user receiving the service provided by one of the regional servers 3A, 3B, . . . managed by the master server 1 further receives a new service.

As in the first processing example, specific description will be made of processing in a case where the user U1 already receiving the service A provided by the regional server 3A receives anew the service B provided by the regional server 3B.

Incidentally, processing of step S1301 is similar to the processing of step S1001 in FIG. 10, and therefore description thereof will be omitted. Similarly, processing of step S1302 is similar to the processing of step S1002 in FIG. 10, processing of step S1401 is similar to the processing of step S1101 in FIG. 10, and processing of step S1402 is similar to the processing of step S1102 in FIG. 10, and therefore description thereof will be omitted.

When the user registration information managing unit 3a of the regional server 3B succeeds in authenticating the user U1 in the login authentication processing of step S1402, the user registration information managing unit 3a in next step S1403 performs processing of requesting complementary information from the master server 1. This processing obtains the complementary attribute information Y of the user U1 from the master server 1. However, the complementary attribute information Y may not be able to be obtained from the master server 1 due to some cause. Specifically, a malfunction in the master server 1, a malfunction in a line, or the like may occur.

The regional server 3B for example sets a predetermined wait time. When the complementary attribute information Y of the user U1 cannot be obtained from the master server 1 within the time, the regional server 3B performs complementary information requesting processing directed to the regional server 3A in step S1404. Incidentally, as for a method of selecting the next regional server 3 as a target for the complementary information requesting processing in the case where the complementary attribute information Y cannot be received from the master server 1, it suffices, for example, to store regional servers 3 as targets for the complementary information requesting processing in the regional server 3B in advance, together with an order of priority, and make selection on the basis of the order of priority. The order of priority may be given in consideration of whether or not the complementary attribute information Y of the user U1 is stored in the regional servers 3, or a predetermined order of priority may be given to the regional servers 3, 3, . . . regardless of whether or not the complementary attribute information Y is stored in the regional servers 3.

Next, the login processing unit 3c of the regional server 3A that receives a complementary attribute information request performs checking processing in step S1501. When it is determined in the checking processing that there is no problem with the received complementary information request, the communication control unit 3d of the regional server 3A in next step S1502 performs complementary information transmission processing of transmitting the complementary attribute information Y of the user U1.

The data processing unit 3b of the regional server 3B that receives the complementary attribute information Y as a result of the complementary information transmission processing performs reconstruction processing of reconstructing the attribute information of the user U1 in step S1405.

Incidentally, an example has been illustrated above in which the complementary information requesting processing directed to the regional server 3A is performed when the complementary attribute information Y cannot be received from the master server 1. However, the obtainment of the complementary attribute information from the master server 1 may be forgone when a processing load on the master server 1 is high, and the complementary information requesting processing directed to the regional server 3A may be performed.

As a result of performing the series of processing depicted in FIG. 11 in the master server 1 and the regional servers 3A and 3B, the regional server 3B can reconstruct the attribute information of the user U1 when the user U1 uses anew the service B provided by the regional server 3B. At this time, the complementary attribute information Y can be received from the regional server 3A even under conditions where the regional server 3B cannot obtain the complementary attribute information Y of the user U1 from the master server 1.

5. OTHER MODIFICATIONS

It has been assumed that when the regional server 3A requests the transmission of the complementary attribute information Y from the master server 1 (or another regional server 3B or 3C or the like), information identifying the incomplete attribute information X retained by the regional server 3A as one of the incomplete attribute information X1, X2, . . . is transmitted. However, the information does not have to be transmitted. In this case, it suffices, for example, for the master server 1 (or another regional server 3B or 3C or the like) to store information indicating which of the incomplete attribute information X1, X2, . . . each of the regional servers 3A, 3B, . . . retains. In this case, appropriate complementary attribute information Y is selected by checking which of the regional servers 3 has requested the transmission of the complementary attribute information Y, and the complementary attribute information Y is transmitted to the regional server 3.

Incidentally, the checking processing in step S1201 in FIG. 10 or step S1501 in FIG. 11 does not have to be performed. In that case, in the complementary information requesting processing directed to the master server 1 or another regional server 3, the regional server 3 does not have to transmit the login password of the user U1.

Figure 12:
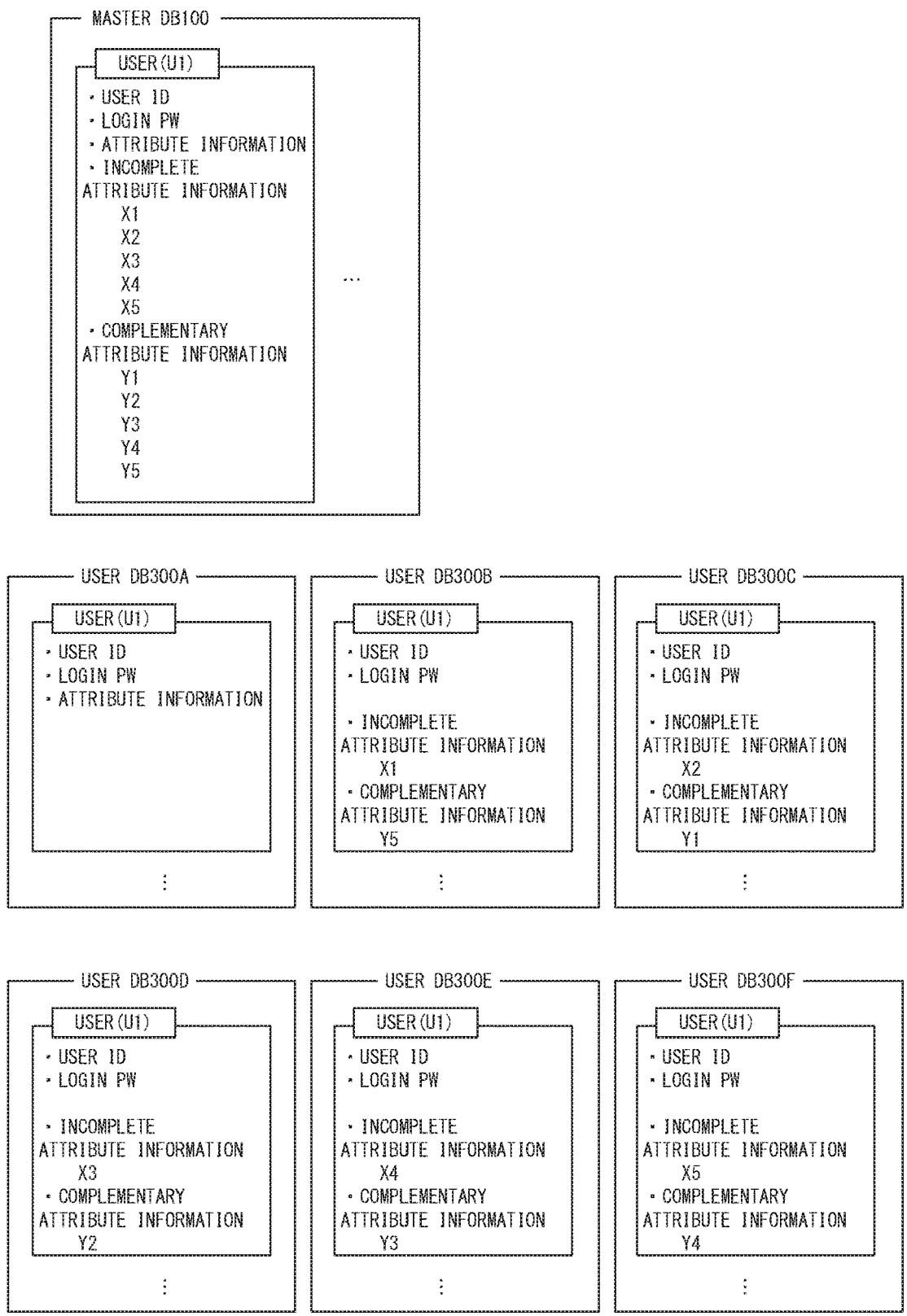
FIG. 12 is a diagram depicting the other example of the information stored in the master DB and the user DBs.

In addition, in a case where there are many regional servers 3, 3, . . . , the number of pieces of complementary attribute information Y1, Y2 . . . stored in the user DBs 300 managed by the respective regional servers 3, 3, . . . may be reduced. Specifically, as depicted in FIG. 12, for the user U1 receiving only the service provided by the regional server 3A, each user DB 300 stores the user registration information or the incomplete user information of the user U1. Specifically, the user DB 300a stores the user ID, the login password, and the attribute information as user registration information. In addition, the user DB 300b stores incomplete attribute information X1 and complementary attribute information Y5 together with the user ID and the login password. Similarly, the user DB 300c stores incomplete attribute information X2 and complementary attribute information Y1 together with the user ID and the login password. The user DB 300d stores incomplete attribute information X3 and complementary attribute information Y2 together with the user ID and the login password. The user DB 300e stores incomplete attribute information X4 and complementary attribute information Y3 together with the user ID and the login password. The user DB 300f stores incomplete attribute information X5 and complementary attribute information Y4 together with the user ID and the login password.

Consequently, the information of the user U1 which information is stored in each user DB 300 is reduced, which can contribute to a reduction in amount of data managed by the user DBs 300.

Further, the processing from step S302 on down as described with reference to FIG. 8 does not have to be performed in a case where the user receives only one service.

Specifically, in a state in which the user U1 receives only the service A when the regional server 3A providing the service A, the regional server 3B providing the service B, and the regional server 3C providing the service C are under management of the master server 1, the master server 1 (or only the regional server 3A providing the service A) manages the user U1 as a local user receiving only the service A. In this case, the incomplete attribute information X and the complementary attribute information Y of the user U1 are not generated. Further, only after the user U1 is in a state of receiving the service B as another service, the master server 1 manages the user U1 as a global user receiving the plurality of services, the incomplete attribute information X and the complementary attribute information Y of the user U1 are generated, and the user ID, the login password, and the incomplete attribute information X are transmitted to the regional server 3C providing another service C. Further, the complementary attribute information Y is transmitted to the regional server 3A and the regional server 3B in step S303 in FIG. 8. This prevents indiscriminate diffusion of user registration information to the regional servers 3.

In addition, the master server 1 depicted in FIGS. 8 to 11 may be an information processing device identical with one of the regional servers 3. That is, the master server 1 manages the user registration information managed by the other regional servers 3, and the master server 1 itself plays the role of a regional server 3 providing some service. In this case, the one of the regional servers 3 performs the above-described pieces of processing to be performed by the master server 1. In this case, the user registration information managing unit 3a, the data processing unit 3b, the login processing unit 3c, and the communication control unit 3d of the regional server 3 in question respectively function as the user registration information managing unit 1a, the data processing unit 1b, the login processing unit 1c, and the communication control unit 1d of the master server 1. Accordingly, the user DB 300 functions as the master DB 100.

Further, the functions of the master server 1 may be implemented by using the units of each of the regional servers 3, 3, . . . .

Specifically, in each piece of processing for the user registration information related to a user under management of a regional server 3, the regional server 3 may play the role of the master server 1. That is, the user registration information of the user U1 receiving the service A provided by the regional server 3A is managed by the regional server 3A as the master server 1. In addition, as for the user registration information of the user U2 not receiving the service A, incomplete user information generated by another regional server 3 is received and managed by the regional server 3A as a regional server 3.

6. SUMMARY

As described above, the master server 1 includes: the user registration information managing unit 1a as a registration information obtaining unit configured to obtain a user ID, a login password, and attribute information in association with one another as user registration information; the data processing unit 1b as a data generating unit configured to generate incomplete attribute information X and complementary attribute information Y such that the attribute information can be reconstructed by combining the incomplete attribute information X and the complementary attribute information Y with each other; and the communication control unit 1d as a transmission processing unit configured to be able to transmit the user ID, the login password, the incomplete attribute information X, and the complementary attribute information Y to a regional server 3 (the regional server 3B in FIG. 8 or the like); the communication control unit 1d transmitting the user ID, the login password, and the incomplete attribute information X to the regional server 3 (the regional server 3B in FIG. 8 or the like) after the user registration information managing unit 1a obtains the user registration information, and the communication control unit 1d transmitting the complementary attribute information Y in response to a request from the regional server 3 (the regional server 3B in FIG. 10 or the like) after the transmission of the user ID, the login password, and the incomplete attribute information X.

Thus, minimum information (the user ID and the login password) necessary for the login of a user is transmitted to the regional server 3, and as for the attribute information of the user which information is desired not to be diffused indiscriminately, the incomplete attribute information X is transmitted as incomplete information. In addition, the complementary attribute information Y corresponding to the incomplete attribute information X and enabling the attribute information to be reconstructed is transmitted on the basis of a request from the regional server 3. That is, reconstructed attribute information is not transmitted unless needed by the regional server 3. Therefore chances of unintentional leakage of the user registration information to the outside can be reduced.

In addition, as described with reference to FIGS. 8 to 11 and in the other modifications, the master server 1 is an information processing device that manages user registration information of a user receiving a service in a certain region, and can perform transmission and reception to and from the other information processing device that manages user registration information of a user receiving a service in another region.

Thus, the user attribute information desired not to be diffused indiscriminately is transmitted in an unreconstructable state as incomplete attribute information to other regional servers 3 managing users in respective regions. Therefore the chances of unintentional leakage of the user registration information to the outside can be reduced.

Further, as described in the second example of processing in receiving new service and with reference to FIG. 12, the data processing unit 1b generates incomplete attribute information X1, X2, . . . , and Xn and complementary attribute information Y1, Y2, . . . , and Yn, the complementary attribute information Y1, Y2, . . . , and Yn corresponding to the incomplete attribute information X1, X2, . . . , and Xn, respectively, and being such that the attribute information can be reconstructed only by reconstruction processing using the complementary attribute information and the corresponding incomplete attribute information in combination with each other, and the communication control unit 1d allocates and transmits the incomplete attribute information X1, X2, . . . , and Xn to the regional servers 3A, 3B, . . . , and 3N, respectively, and allocates and transmits the complementary attribute information Y1, Y2, . . . , and Yn to the regional servers 3A, 3B, . . . , and 3N in a state in which the complementary attribute information is not in correspondence with the incomplete attribute information.

Thus, the complementary attribute information Y1 for reconstructing the user attribute information, for example, is allocated and transmitted to not only the master server 1 but also one of the regional servers 3A, 3B, . . . , and 3N. Therefore, a regional server 3 that needs the complementary attribute information Y1 can obtain the complementary attribute information Y from the one of the regional servers 3 even when the complementary attribute information Y cannot be obtained from the master server 1.

Furthermore, as described in the other modifications, the user registration information managing unit 1a manages the user ID as local user identification information in the user registration information of the user U1 receiving only the service A, and when the user U1 receives the service B, the user registration information managing unit 1a manages the local user identification information as global user identification information and manages the attribute information associated with the local user identification information of the user U1 as attribute information associated with the global user identification information of the user U1 in the user registration information of the user U1.

Thus, for example, in a case where incomplete generation processing is performed targeting only users managed as global users, the incomplete attribute information X and the complementary attribute information Y of users managed as local users are not transmitted to each regional server 3. Hence, indiscriminate diffusion of the user registration information to the regional servers 3 is prevented.

In addition, as described in step S203, the user registration information managing unit 1a performs new user registration processing of obtaining user registration information of a new user. In the new user registration processing, input attribute information is registered in association with global user identification information as input user identification information.

Thus, the user registration information of a new user which information is input to receive a certain service is associated with global user identification information, and is managed by the master server 1.

Further, as described with reference to FIG. 8 and in the other modifications, after the user registration information managing unit 1a registers user registration information of a global user receiving a plurality of services, the communication control unit 1d transmits the user ID, the login password, and the incomplete attribute information X of the global user to the regional server 3.

Thus, an environment is provided in which after a user is registered as a global user, the user ID, the login password, and the incomplete attribute information X of the user can be transmitted to a regional server 3 providing a service not received by the user before the user receives the service. That is, when the user is a local user, the incomplete attribute information X and the complementary attribute information Y are not transmitted. Therefore indiscriminate diffusion of the user registration information or a part of the information is prevented.

Furthermore, as described in the other modifications, after the user registration information managing unit 1a registers the user registration information of a global user receiving a plurality of services, and the login processing unit 1c performs login processing based on login operation of the global user, the communication control unit 1d transmits the user ID, the login password, and the incomplete attribute information X of the global user to the regional server 3.

This prevents diffusion of the user registration information or a part of the information that is unnecessary until the user actually logs in. Further, when the user registration information becomes necessary because the user actually logs in, the user registration information or a part of the information is transmitted to the other information processing device. Hence, the chances of unintentional leakage of the user registration information to the outside can be reduced.

The above-described regional server 3 includes: the user registration information managing unit 3a as a managing unit configured to manage incomplete user registration information as a part of user registration information, the user registration information including a user ID, a login password and attribution information associated with one another, the incomplete user registration information including the user ID, the login password and incomplete attribution information X associated with one another, and the attribution information being reconstructable by combining the incomplete attribution information X with complementary attribution information; the login processing unit 3c configured to perform login authentication processing in response to input of the user ID and the login password by a user; and the data processing unit 3b as a reconstruction processing unit configured to request transmission of the complementary attribute information Y from the master server 1 (or another regional server 3), and reconstruct the attribute information on the basis of the complementary attribute information Y obtained and the incomplete attribute information X.

Thus, the attribute information of the user which attribute information is desired not to be diffused indiscriminately is received from the master server 1 (or another regional server 3) as the incomplete attribute information X together with the user ID and the login password, and further the complementary attribute information Y that enables the reconstruction of the attribute information of the user is received on the basis of a login operation. Indiscriminate diffusion of the user registration information or a part of the information is thereby prevented.

In addition, as described with reference to FIGS. 8 to 11 and in the other modifications, the regional server 3 is an information processing device that manages the user registration information of the user receiving a service in a certain region, and can perform transmission and reception to and from the other information processing device (the master server 1 or another regional server 3) that manages user registration information of a user receiving a service in another region.

Thus, the attribute information of a user which attribute information is desired not to be indiscriminately diffused outside a region in which a service received by the user is provided is received in an unreconstructable state. In addition, as required, a request is made to the other information processing device for transmission of the complementary attribute information that enables the reconstruction of the attribute information of the user, and the complementary attribute information is received. Therefore indiscriminate diffusion of the user registration information or a part of the information is prevented.

In addition, as described in the second example of processing in receiving new service or the like, when the complementary attribute information Y cannot be obtained in response to the requesting of the transmission from the master server 1 (or another regional server 3), the data processing unit 3b requests transmission of the complementary attribute information Y from yet another regional server 3 (for example the regional server 3A in FIG. 11).

This avoids a state in which the complementary attribute information Y cannot be obtained due to a malfunction in the master server 1 (or the other regional server 3) or a malfunction in a line, for example. The processing of reconstructing the attribute information of the user can therefore be performed more surely.

In addition, as described in the second example of processing in receiving new service, in the other modifications, and with reference to FIG. 12 or the like, the master server 1 generates incomplete attribute information X1, X2, ..., and Xn based on the attribute information of the user U1 and complementary attribute information Y1, Y2, ..., and Yn corresponding to the incomplete attribute information X1, X2, ..., and Xn, respectively, and being such that the attribute information can be reconstructed only by processing using the complementary attribute information Y1, Y2, ..., and Yn and the corresponding incomplete attribute information X1, X2, ..., and Xn in combination with each other, and in a state in which at least one piece of incomplete attribute information of the incomplete attribute information X1, X2, ..., and Xn is transmitted from the master server 1 to the data processing unit 3*b*, and at least one piece of complementary attribute information of the complementary attribute information Y1, Y2, . . . , and Yn excluding the complementary attribute information Y corresponding to the incomplete attribute information X transmitted to the data processing unit 3*b* is transmitted to the data processing unit 3*b*, the user registration information managing unit 3*a* manages the incomplete attribute information X and the complementary attribute information Y transmitted to the data processing unit 3*b* in association with the user ID of the user U1.

Thus, one piece of incomplete attribute information of the incomplete attribute information X1, X2, . . . , and Xn of the user U1 and one piece of complementary attribute information of the complementary attribute information Y1, Y2, . . . , and Yn, the one piece of complementary attribute information not corresponding to the one piece of incomplete attribute information, are managed in association with each other, and the management of each piece of information related to the user U1 is facilitated.

7. PROGRAM AND STORAGE MEDIUM

The master server 1 and the regional servers 3 according to the present invention have been described above. A program according to an embodiment is a program that makes an arithmetic processing device (CPU or the like) perform processing in the master server 1 or the regional servers 3.

A program executed by the master server 1 according to an embodiment makes the arithmetic processing device perform a step of obtaining user identification information, a login password, and attribute information in association with one another as user registration information.

In addition, the arithmetic processing device is made to perform a step of generating incomplete attribute information and complementary attribute information such that the attribute information can be reconstructed by combining the incomplete attribute information and the complementary attribute information with each other.

Further, the arithmetic processing device is made to perform a step of performing transmission processing of transmitting the user identification information, the login password, and the incomplete attribute information to another information processing device.

Furthermore, the arithmetic processing device is made to perform a step of transmitting the complementary attribute information in response to a request from the other information processing device after performing the transmission processing.

That is, this program makes the arithmetic processing device perform the processing of steps S301 to S303 depicted in FIG. 8, the processing of steps S701 to S704 depicted in FIG. 9, and the processing of steps S1201 and S1202 depicted in FIG. 10. In addition, in some cases, the program makes the arithmetic processing device perform the processing of steps S201 to S205 and step S401 depicted in FIG. 8, the processing of steps S601 to S604, step S801, and step S901 depicted in FIG. 9, the processing of steps S1101 to S1104 depicted in FIG. 10, and the processing of steps S1401 to S1405 and steps S1501 and S1502 depicted in FIG. 11.

On the other hand, a program executed by a regional server 3 according to an embodiment makes the arithmetic processing device perform a step of managing incomplete user registration information as a part of user registration information, the user registration information including user identification information, a login password and attribution information associated with one another, the incomplete user registration information including the user identification information, the login password and incomplete attribution information associated with one another, and the attribution information being reconstructable by combining the incomplete attribution information with complementary attribution information.

In addition, the arithmetic processing device is made to perform a step of performing login processing in response to input of the user identification information and the login password by a user.

Further, the arithmetic processing device is made to perform a step of requesting transmission of the complementary attribute information from another information processing device, and performing reconstruction processing of reconstructing the attribute information on the basis of the complementary attribute information obtained and the incomplete attribute information.

That is, this program makes the arithmetic processing device perform the processing of steps S201 to S205 and step S401 depicted in FIG. 8, the processing of steps S601 to S604, step S801, and step S901 depicted in FIG. 9, the processing of steps S1101 to S1104 depicted in FIG. 10, and the processing of steps S1401 to S1405 and steps S1501 and S1502 depicted in FIG. 11.

The master server 1 and the regional servers 3 described above can be implemented by such programs.

Such programs can be stored in advance in an HDD as a storage medium incorporated in an apparatus such as a computer device or the like, a ROM within a microcomputer having a CPU, or the like. Alternatively, the programs can be temporarily or permanently stored on a removable storage medium such as a semiconductor memory, a memory card, an optical disk, a magneto-optical disk, a magnetic disk, or the like. In addition, such a removable storage medium can be provided as so-called packaged software.

In addition, such programs can be not only installed from a removable storage medium onto a personal computer or the like, but also downloaded from a download site via a network such as a LAN, the Internet, or the like.

REFERENCE SIGNS LIST

1 Master server, 1*a* User registration information managing unit, 1*b* Data processing unit, 1*c* Login processing unit, 1*d* Communication control unit, 2 Communication network, 3 (3A, 3B, . . . ) Regional server, 3*a* User registration information managing unit, 3*b* Data processing unit, 3*c* Login processing unit, 3*d* Communication control unit, 4 User terminal, 100 Master DB, 300 (300*a*, 300*b*, . . . ) User DB

What is claimed is:

1. An information processing device comprising:
at least one memory that stores computer executable code; and
at least one hardware processor configured to execute the executable code, which causes the at least one hardware processor to:
obtain user identification information, a login password, and user attribute information in association with one another as user registration information;
generate incomplete user attribute information that corresponds to the obtained user attribute information with a portion of the user attribute information removed, and complementary user attribute information that corresponds to the portion of the user attribute information that was removed in the generating of the incomplete user attribute information, wherein the generating of the incomplete user attribute information includes removing one or more predetermined bits from the user attribute information, and the complementary user attribute information corresponds to the one or more predetermined bits that were removed from the user attribute information in the generating of the incomplete user attribute information; and transmit the incomplete user attribute information with the user identification information to another information processing device, and, in response to a request for the complementary user attribute information from the other information processing device after the transmission of the incomplete user attribute information, transmit the complementary user attribute information to the other information processing device, thereby providing, to the other information processing device, necessary pieces to be combined for reconstructing the user attribute information.

2. The information processing device according to claim 1, wherein the information processing device is an information processing device that manages user registration information of a user receiving a service in a certain region, and performs transmission and reception to and from the other information processing device, which manages user registration information of a user receiving a service in another region.

3. The information processing device according to claim 1, wherein the at least one hardware processor is further configured to execute the executable code, which further causes the at least one hardware processor to, generate first to n-th incomplete user attribute information and first to n-th complementary user attribute information, the first to n-th complementary user attribute information corresponding to the first to n-th incomplete user attribute information, respectively, and being such that the user attribute information can be reconstructed only by processing using the first to n-th complementary user attribute information and the corresponding incomplete user attribute information in combination with each other, allocate and transmit the first to n-th incomplete user attribute information to a first to an n-th other information processing devices, respectively, and allocate and transmit the first to n-th complementary user attribute information to the first to n-th other information processing devices in a state in which the complementary user attribute information is not in correspondence with the incomplete user attribute information.

4. The information processing device according to claim 1, wherein the at least one hardware processor is further configured to execute the executable code, which further causes the at least one hardware processor to, manage the user identification information as local user identification information in the user registration information of a user receiving only a certain service, and when the user receives another service, manage the local user identification information as global user identification information, and manage the user attribute information associated with the local user identification information of the user as user attribute information associated with the global user identification information of the user in the user registration information of the user.

5. The information processing device according to claim 1, wherein the at least one hardware processor is further configured to execute the executable code, which further causes the at least one hardware processor to, perform new user registration processing of obtaining user registration information of a new user, and based on the new user registration processing, register input user attribute information in association with global user identification information as input user identification information.

6. The information processing device according to claim 1, wherein the at least one hardware processor is further configured to execute the executable code, which further causes the at least one hardware processor to, after user registration information of a global user receiving a plurality of services is registered, transmit the user identification information, the login password, and the incomplete user attribute information of the global user to the other information processing device.

7. The information processing device according to claim 1, wherein the at least one hardware processor is further configured to execute the executable code, which further causes the at least one hardware processor to, perform login processing in response to input of the user identification information and the login password by a user, and after the user registration information of a global user receiving a plurality of services has been registered, and the login processing based on a login operation of the global user has been performed, transmit the user identification information, the login password, and the incomplete user attribute information of the global user to the other information processing device.

8. The information processing device according to claim 1, wherein the transmitting of the incomplete user attribute information with the user identification information includes transmitting the login password with the incomplete user attribute information and the user identification information.

9. An information processing device comprising:

at least one memory that stores computer executable code; and at least one hardware processor configured to execute the executable code, which causes the at least one hardware processor to:

manage incomplete user registration information as a part of user registration information, the user registration information including user identification information, a login password and user attribute information associated with one another, the incomplete user registration information including the user identification information, the login password and incomplete user attribute information associated with one another, and the incomplete user attribute information corresponding to the obtained user attribute information with a portion of the user attribute information removed;

perform login processing in response to input of the user identification information and the login password by a user; and request transmission of complementary user attribute information from another information processing device;

obtain, from the other information processing device, the complementary user attribute information; and reconstruct the user attribute information on a basis of the obtained complementary user attribute information and the incomplete user attribute information, wherein the complementary user attribute information corresponds to the portion of the user attribute information that was removed in the generating of the incomplete user attribute information, wherein the generating of the incomplete user attribute information includes removing one or more predetermined bits from the user attribute information, and the complementary user attribute information corresponds to the one or more predetermined bits that were removed from the user attribute information in the generating of the incomplete user attribute information.

10. The information processing device according to claim 9, wherein the at least one hardware processor is further configured to execute the executable code, which further causes the at least one hardware processor to, manage user registration information of a user receiving a service in a certain region, and perform transmission and reception to and from the other information processing device that manages user registration information of a user receiving a service in another region.

11. The information processing device according to claim 9, wherein the at least one hardware processor is further configured to execute the executable code, which further causes the at least one hardware processor to, when the complementary user attribute information cannot be obtained within a predetermined amount of time in response to the requesting of the transmission from the other information processing device, request transmission of the complementary user attribute information from a third information processing device.

12. The information processing device according to claim 9, wherein first to n-th incomplete user attribute information based on the user attribute information of a certain user and first to n-th complementary user attribute information respectively corresponding to the first to n-th incomplete user attribute information are generated by the other information processing device such that the user attribute information can be reconstructed only by processing using the first to n-th complementary user attribute information and the corresponding incomplete user attribute information in combination with each other, and in a state in which at least one piece of incomplete user attribute information of the first to n-th incomplete user attribute information is transmitted from the other information processing device to the at least one at least one hardware processor, and at least one piece of complementary user attribute information of the first to n-th complementary user attribute information excluding the complementary user attribute information corresponding to the incomplete user attribute information is transmitted to the at least one hardware processor, reconstruct the user attribute information, and manage the incomplete user attribute information and the complementary user attribute information in association with the user identification information of the certain user.

13. An information processing method performed by an information processing device, the information processing method comprising:

obtaining user identification information, a login password, and user attribute information in association with one another as user registration information;

generating incomplete user attribute information that corresponds to the obtained user attribute information with a portion of the user attribute information removed, and complementary user attribute information that corresponds to the portion of the user attribute information that was removed in the generating of the incomplete user attribute information, wherein the generating of the incomplete user attribute information includes removing one or more predetermined bits from the user attribute information, and the complementary user attribute information corresponds to the one or more predetermined bits that were removed from the user attribute information in the generating of the incomplete user attribute information; and transmitting the incomplete attribute information with the user identification information to another information processing device, and, in response to a request for the complementary user attribute information from the another information processing device after the transmission of the incomplete user attribute information, transmitting the complementary user attribute information to the other information processing device, thereby providing, to the other information processing device, necessary pieces to be combined for reconstructing the user attribute information.

14. An information processing method performed by an information processing device, the information processing method comprising:

managing incomplete user registration information as a part of user registration information, the user registration information including user identification information, a login password and user attribute information associated with one another, the incomplete user registration information including the user identification information, the login password and incomplete user attribute information associated with one another, and the incomplete user attribute information corresponding to the obtained user attribute information with a portion of the user attribute information removed;

performing login processing in response to input of the user identification information and the login password by a user;

requesting transmission of the complementary user attribute information from another information processing device obtaining, from the other information processing device, the complementary user attribute information; and performing reconstruction processing of reconstructing the user attribute information on a basis of the complementary user attribute information obtained and the incomplete user attribute information, wherein the complementary user attribute information corresponds to the portion of the user attribute information that was removed in the generating of the incomplete user attribute information, wherein the generating of the incomplete user attribute information includes removing one or more predetermined bits from the user attribute information, and the complementary user attribute information corresponds to the one or more predetermined bits that were removed from the user attribute information in the generating of the incomplete user attribute information.

15. A non-transitory storage medium that stores computer program code, which, when executed by a computer, causes the computer to:

obtain user identification information, a login password, and attribute information in association with one another as user registration information;

generate incomplete user attribute information that corresponds to the obtained user attribute information with a portion of the user attribute information removed, and complementary user attribute information that corresponds to the portion of the user attribute information that was removed in the generating of the incomplete user attribute information, wherein the generating of the incomplete user attribute information includes removing one or more predetermined bits from the user attribute information, and the complementary user attribute information corresponds to the one or more predetermined bits that were removed from the user attribute information in the generating of the incomplete user attribute information; and transmit the incomplete user attribute information with the user identification information to another information processing device, and, in response to a request for the complementary user attribute information from the another information processing device after the transmission of the incomplete user attribute information, transmit the complementary user attribute information to the another information processing device, thereby providing, to the other information processing device, necessary pieces to be combined for reconstructing the user attribute information.

16. A non-transitory storage medium that stores computer program code, which, when executed by a computer, causes the computer to:

a step of managing incomplete user registration information as a part of user registration information, the user registration information including user identification information, a login password and user attribute information associated with one another, the incomplete user registration information including the user identification information, the login password and incomplete user attribute information associated with one another, and the incomplete user attribute information corresponding to the obtained user attribute information with a portion of the user attribute information removed;

a step of performing login processing in response to input of the user identification information and the login password by a user;

a step of requesting transmission of the complementary user attribute information from another information processing device;

a step of obtaining, from the other information processing device, the complementary user attribute information; and a step of performing reconstruction processing of reconstructing the user attribute information on a basis of the complementary user attribute information obtained and the incomplete user attribute information, wherein the complementary user attribute information corresponds to the portion of the user attribute information that was removed in the generating of the incomplete user attribute information, wherein the generating of the incomplete user attribute information includes removing one or more predetermined bits from the user attribute information, and the complementary user attribute information corresponds to the one or more predetermined bits that were removed from the user attribute information in the generating of the incomplete user attribute information.

* * * * *